United States Patent
Grzesiak et al.

(10) Patent No.: US 12,353,957 B2
(45) Date of Patent: Jul. 8, 2025

(54) QUANTUM CIRCUIT CONSTRUCTION WITH SIMULTANEOUSLY ENTANGLING GATES IN TRAPPED-ION QUANTUM COMPUTERS

(71) Applicants: IONQ, INC., College Park, MD (US); University of Maryland, College Park, MD (US)

(72) Inventors: Nikodem Grzesiak, College Park, MD (US); Andrii Maksymov, Hyattsville, MD (US); Pradeep Niroula, College Park, MD (US); Yunseong Nam, North Bethesda, MD (US)

(73) Assignee: IONQ, INC., College Park, MD (US)

( * ) Notice: Subject to any disclaimer, the term of this patent is extended or adjusted under 35 U.S.C. 154(b) by 514 days.

(21) Appl. No.: 17/862,039

(22) Filed: Jul. 11, 2022

(65) Prior Publication Data
US 2023/0259804 A1 Aug. 17, 2023

Related U.S. Application Data

(60) Provisional application No. 63/220,860, filed on Jul. 12, 2021.

(51) Int. Cl.
*G06N 10/40* (2022.01)
*G06N 10/80* (2022.01)

(52) U.S. Cl.
CPC ............. *G06N 10/40* (2022.01); *G06N 10/80* (2022.01)

(58) Field of Classification Search
USPC .......................... 716/101, 100, 104, 105, 106
See application file for complete search history.

(56) References Cited

U.S. PATENT DOCUMENTS

| | | |
|---|---|---|
| 11,461,688 B2 | 10/2022 | Nam et al. |
| 2020/0372389 A1 | 11/2020 | Nam et al. |
| 2020/0372392 A1* | 11/2020 | Nam ..................... G06N 10/40 |

OTHER PUBLICATIONS

Grzesiak, N., Blumel, R., Wright, K. et al. Efficient arbitrary simultaneously entangling gates on a trapped-ion quantum computer. Nat Commun 11, 2963 (2020).
D. Maslov and Y. Nam., Use of global interactions in efficient quantum circuit constructions. New J. Phys. 20, 033018 (2018).
K. Groenland, F. Witteveen, K. Schoutens, and R. Gerritsma, Signal processing techniques for efficient compilation of controlled rotations in trapped ions. New J. Phys. 22, 063006 (2020).
J. van de Wetering, Constructing quantum circuits with global gates. New J. Phys. 23 043015 (2021).

(Continued)

*Primary Examiner* — Brian Ngo
(74) *Attorney, Agent, or Firm* — Patterson + Sheridan, LLP

(57) ABSTRACT

A method of performing computation using an ion trap quantum computing system including a classical computer, a system controller, and a quantum processor includes computing, by the classical computer, a circuit that implements a selected set of gate operations, using one or more efficient arbitrary simultaneous entangling (EASE) gates, implementing, by the system controller, the computed circuit on the quantum processor, measuring, by the system controller, population of qubit states in the quantum processor, and outputting, by the classical computer, the measured population of qubit states in the quantum processor.

3 Claims, 11 Drawing Sheets

(56) References Cited

OTHER PUBLICATIONS

R. Duncan, A. Kissinger, S. Perdrix, and J. Van De Wetering, Graph-theoretic Simplification of Quantum Circuits with the ZX-calculus. Quantum 4, 279 (2020).
C. Moore and M. Nilsson, Parallel Quantum Computation and Quantum Codes. SIAM Journal on Computing 31, 799 (2001).
Niroula, P., Nam, Y., A quantum algorithm for string matching. npj Quantum Inf 7, 37 (2021).
Japanese Patent Application No. 2023-580995, Office Action dated Feb. 25, 2025, 6 pages.
Nikodem Grzesiak et al. "Efficient Arbitrary Simultaneously Entangling Gates on a Trapped-Ion Quantum Computer", arXiv:1905.09294, May 22, 2019.
Reinhold Blumel et al. "Power-Optimal, Stabilized Entangling Gate between Trapped-ion Qubits", arXiv:1905.09292, May 22, 2019.
Figgatt C. et al. "Parallel Entangling Operations on a Universal Ion-Trap Quantum Computer", Nature Publishing Group UK, London, vol. 572, No. 7769, Jul. 24, 2019.
International Search Report dated Mar. 14, 2023 for Application No. PCT/US2022/036715.

* cited by examiner

QUANTUM CIRCUIT CONSTRUCTION WITH SIMULTANEOUSLY ENTANGLING GATES IN TRAPPED-ION QUANTUM COMPUTERS

CROSS-REFERENCE TO RELATED APPLICATIONS

This application claims the benefit of U.S. Provisional Application No. 63/220,860, filed Jul. 12, 2021, which is incorporated by reference herein.

GOVERNMENT RIGHTS

This invention was made with Government support under 70NANB16H168 awarded by the National Institute of Standards and Technology. The Government has certain rights in this invention.

BACKGROUND

Field

The present disclosure generally relates to a method of performing computation in an ion trap quantum computer, and more specifically, to a method of constructing quantum circuits using efficient arbitrary simultaneous entangling (EASE) gates.

Description of the Related Art

Quantum computers have been shown to improve performance of certain computational tasks when compared to what classical computers can do. Conventionally, a quantum algorithm used to perform such computational tasks is compiled by a set of universal gates, including single-qubit gates and two-qubit gates, that are sequentially executed. However, even with different available quantum computing architectures that exist today, simultaneous (parallel) computations, analogous to single instruction, multiple data (SIMD) processing used in conventional computing, have not been exploited, thus creating longer than desired computation times.

Therefore, there is a need for methods for parallel processing to perform efficient quantum computation.

SUMMARY

Embodiments of the present disclosure provide a method of performing computation using an ion trap quantum computing system including a classical computer, a system controller, and a quantum processor. The method includes computing, by the classical computer, a circuit that implements a selected set of gate operations, using one or more efficient arbitrary simultaneous entangling (EASE) gates, implementing, by the system controller, the computed circuit on the quantum processor, measuring, by the system controller, population of qubit states in the quantum processor, and outputting, by the classical computer, the measured population of qubit states in the quantum processor.

Embodiments of the present disclosure also provide ion trap quantum computing system. The ion trap quantum computing system includes a quantum processor including qubits, each qubit comprising a trapped ion having two hyperfine states, one or more lasers configured to emit a laser beam, which is provided to trapped ions in the quantum processor, a classical computer, and a system controller. The classical computer is configured to perform operations including computing a circuit that implements a selected set of gate operations, using one or more efficient arbitrary simultaneous entangling (EASE) gates. The system controller is configured to execute a control program to control the one or more lasers to perform operations on the quantum processor, the operations including implementing the computed circuit on the quantum processor, and measuring population of qubit states in the quantum processor. The classical computer is further configured to output the measured population of qubit states in the quantum processor.

Embodiments of the present disclosure further provide an ion trap quantum computing system. The ion trap quantum computing system includes a classical computer, a quantum processor comprising qubits, each qubit comprising a trapped ion having two hyperfine states, non-volatile memory having a number of instructions stored therein, a system controller configured to execute a control program to control the one or more lasers to perform operations on the quantum processor, and non-volatile memory having a number of instructions stored therein. The number of instructions, when executed by one or more processors, causes the ion trap quantum computing system to perform operations including computing, by the classical computer, a circuit that implements a selected set of gate operations, using one or more efficient arbitrary simultaneous entangling (EASE) gates, implementing, by the system controller, the computed circuit on the quantum processor, measuring, by the system controller, population of qubit states in the quantum processor, and outputting, by the classical computer, the measured population of qubit states in the quantum processor.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
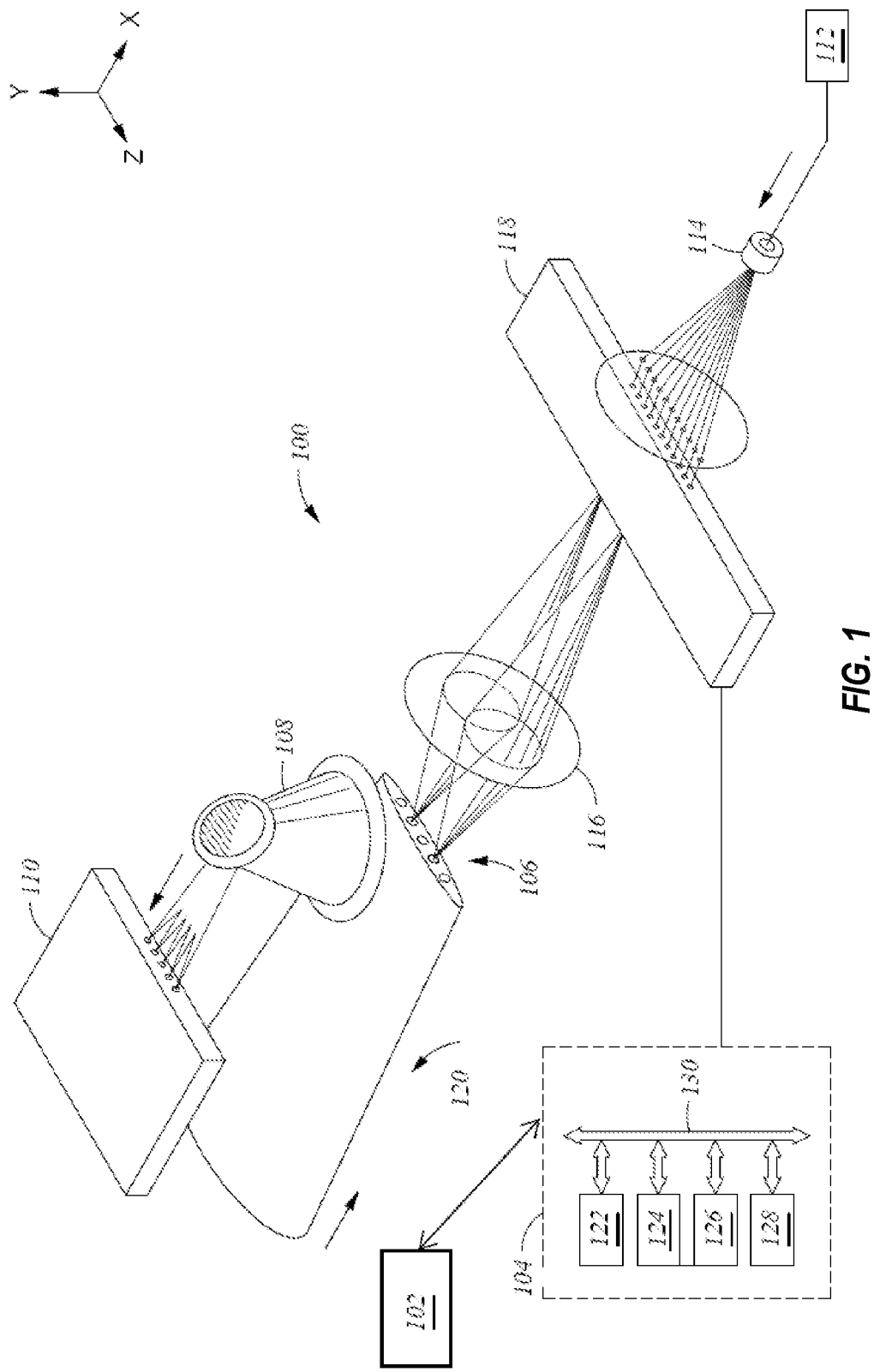
FIG. 1 is a partial view of an ion trap quantum computer according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are generally related to a method and a system for constructing quantum circuits using efficient arbitrary simultaneous entangling (EASE) gates in a quantum computer, such as an ion trap quantum computer. Analogous to the single instruction, multiple data (SIMD) processing used in conventional computing, parallel processing using EASE gates provides a more efficient quantum computational process.

An overall system that is able to perform quantum computations using trapped ions will include a classical computer, a system controller, and a quantum processor. The classical computer performs supporting and system control tasks including selecting a quantum algorithm to be run by use of a user interface, such as graphics processing unit (GPU), compiling the selected quantum algorithm into a series of quantum circuits, translating the series of quantum circuits into laser pulses to apply on the quantum processor, and pre-calculating parameters that optimize the laser pulses by use of a central processing unit (CPU). A software program for performing the task of decomposing and executing the quantum algorithms is stored in a non-volatile memory within the classical computer. The quantum processor includes trapped ions that are coupled with various hardware, including lasers to manipulate internal hyperfine states (qubit states) of the trapped ions and an acousto-optic modulator to read-out the internal hyperfine states (qubit states) of the trapped ions. The system controller receives from the classical computer the pre-calculated parameters for laser pulses at the beginning of running the selected algorithm on the quantum processor, controls various hardware associated with controlling any and all aspects used to run the selected algorithm on the quantum processor, and returns a read-out of the quantum processor and thus output of results of the quantum computation(s) at the end of running the algorithm to the classical computer.

General Hardware Configurations

FIG. 1 is a schematic partial view of an ion trap quantum computing system 100, or simply the system 100 according to one embodiment. The system 100 includes a classical (digital) computer 102 and a system controller 104. Other components of the system 100 shown in FIG. 1 are associated with a quantum processor, including a group 106 of trapped ions (i.e., five shown as circles about equally spaced from each other) that extend along a Z-axis. Each ion in the group 106 of trapped ions is an ion having a nuclear spin I and an electron spin s such that the difference between the nuclear spin I and the electron spin s is zero, such as a positive ytterbium ion, $^{171}\text{Yb}^+$, a positive barium ion $^{133}\text{Ba}^+$, a positive cadium ion $^{111}\text{Cd}^+$ or $^{113}\text{Cd}^+$, which all have a nuclear spin $$I = \frac{1}{2}$$

and the $^2S_{1/2}$ hyperfine states. In some embodiments, all ions in the group 106 of trapped ions are the same species and isotope (e.g., $^{171}\text{Yb}^+$). In some other embodiments, the group 106 of trapped ions includes one or more species or isotopes (e.g., some ions are $^{171}\text{Yb}^+$ and some other ions are $^{133}\text{Ba}^+$). In yet additional embodiments, the group 106 of trapped ions may include various isotopes of the same species (e.g., different isotopes of Yb, different isotopes of Ba). The ions in the group 106 of trapped ions are individually addressed with separate laser beams. The classical computer 102 includes a central processing unit (CPU), memory, and support circuits (or I/O) (not shown). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 108, such as an objective lens with a numerical aperture (NA), for example, of 0.37, collects fluorescence along the Y-axis from the ions and maps each ion onto a multi-channel photo-multiplier tube (PMT) 110 (or some other imaging device) for measurement of individual ions. Raman laser beams from a laser 112, which are provided along the X-axis, perform operations on the ions. A diffractive beam splitter 114 creates an array of Raman laser beams 116 that are individually switched using a multi-channel acousto-optic modulator (AOM) 118. The AOM 118 is configured to selectively act on individual ions by individually controlling emission of the Raman laser beams 116. A global Raman laser beam 120, which is non-copropagating to the Raman laser beams 116, illuminates all ions at once from a different direction. In some embodiments, rather than a single global Raman laser beam 120, individual Raman laser beams (not shown) can be used to each illuminate individual ions. The system controller (also referred to as an "RF controller") 104 controls the AOM 118 and thus controls intensities, timings, and phases of laser pulses to be applied to trapped ions in the group 106 of trapped ions. The CPU 122 is a processor of the system controller 104. The ROM 124 stores various programs and the RAM 126 is the working memory for various programs and data. The storage unit 128 includes a nonvolatile memory, such as a hard disk drive (HDD) or a flash memory, and stores various programs even if power is turned off. The CPU 122, the ROM 124, the RAM 126, and the storage unit 128 are interconnected via a bus 130. The system controller 104 executes a control program which is stored in the ROM 124 or the storage unit 128 and uses the RAM 126 as a working area. The control program will include software applications that include program code that may be executed by the CPU 122 in order to perform various functionalities associated with receiving and analyzing data and controlling any and all aspects of the methods and hardware used to implement and operate the ion trap quantum computing system 100 discussed herein.

Figure 2:
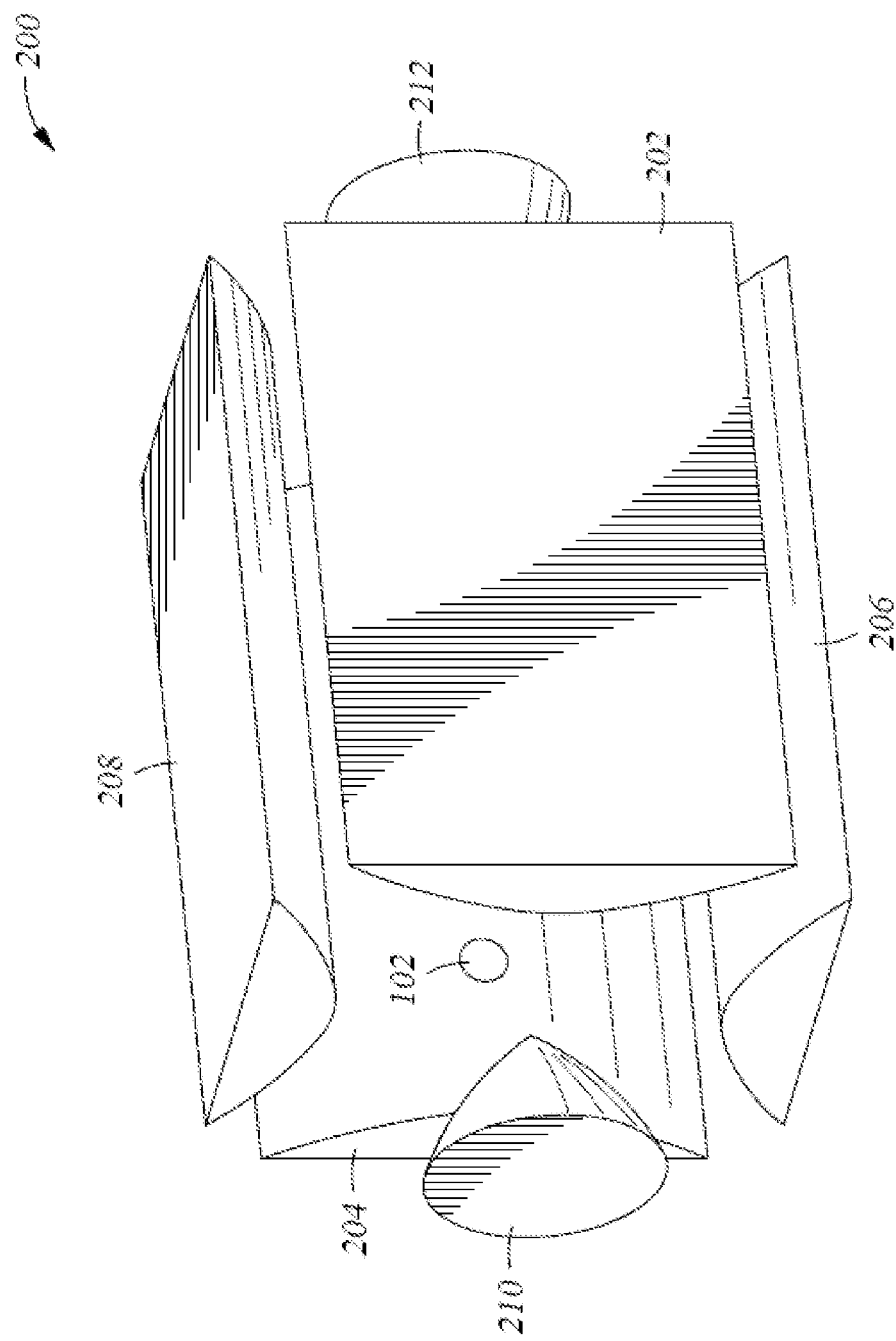
FIG. 2 depicts a schematic view of an ion trap for confining ions in a chain according to one embodiment.

FIG. 2 depicts a schematic view of an ion trap 200 (also referred to as a "Paul trap") for confining ions in the group 106 according to one embodiment. The confining potential is exerted by both static (DC) voltage and radio frequency (RF) voltages. A static (DC) voltage $V_S$ is applied to end-cap electrodes 210 and 212 to confine the ions along the Z-axis (also referred to as an "axial direction" or a "longitudinal direction"). The ions in the group 106 are nearly evenly distributed in the axial direction due to the Coulomb interaction between the ions. In some embodiments, the ion trap 200 includes four hyperbolically-shaped electrodes 202, 204, 206, and 208 extending along the Z-axis.

During operation, a sinusoidal voltage $V_1$ (with an amplitude $V_{RF}/2$) is applied to an opposing pair of the electrodes 202, 204 and a sinusoidal voltage $V_2$ with a phase shift of 180° from the sinusoidal voltage $V_1$ (and the amplitude $V_{RF}/2$) is applied to the other opposing pair of the electrodes 206, 208 at a driving frequency $\omega_{RF}$, generating a quadrupole potential. In some embodiments, a sinusoidal voltage is only applied to one opposing pair of the electrodes 202, 204, and the other opposing pair 206, 208 is grounded. The quadrupole potential creates an effective confining force in the X-Y plane perpendicular to the Z-axis (also referred to as a "radial direction" or "transverse direction") for each of the trapped ions, which is proportional to a distance from a saddle point (i.e., a position in the axial direction (Z-direction)) at which the RF electric field vanishes. The motion in the radial direction (i.e., direction in the X-Y plane) of each ion is approximated as a harmonic oscillation (referred to as "secular motion") with a restoring force towards the saddle point in the radial direction and can be modeled by spring constants $k_x$ and $k_y$, respectively. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points.

Although not shown, a different type of trap is a microfabricated trap chip in which a similar approach as the one described above is used to hold or confine ions or atoms in place above a surface of the micro-fabricated trap chip. Laser beams, such as the Raman laser beams described above, can be applied to the ions or atoms as they sit just above the surface.

Figure 3:
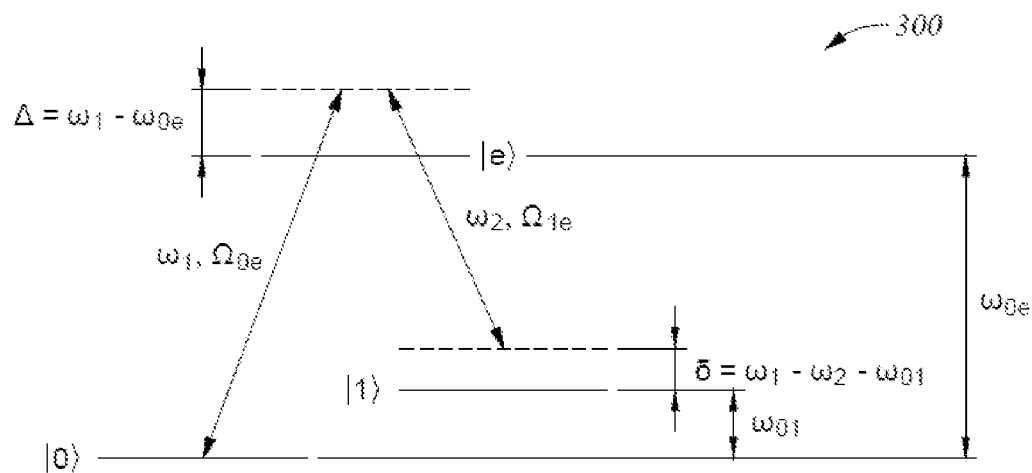
FIG. 3 depicts a schematic energy diagram of each ion in a chain of trapped ions according to one embodiment.

FIG. 3 depicts a schematic energy diagram 300 of each ion in the group 106 of trapped ions according to one embodiment. Each ion in the group 106 of trapped ions is an ion having a nuclear spin I and an electron spin s such that a difference between the nuclear spin I and the electron spin s is zero. In one example, each ion may be a positive Ytterbium ion, $^{171}Yb^+$, which has a nuclear spin $$I = \frac{1}{2}$$

and the $^2S_{1/2}$ hyperfine states (i.e., two electronic states) with an energy split corresponding to a frequency difference (referred to as a "carrier frequency") of $\omega_{01}/2\pi=12.642812$ GHz. In other examples, each ion may be a positive barium ion $^{133}Ba^+$, a positive cadmium ion ca or $^{113}Cd^+$, or $^{113}Cd^+$, which all have a nuclear spin $$I = \frac{1}{2}$$

and the $^2S_{1/2}$ hyperfine states. A qubit is formed with the two hyperfine states, denoted as |0⟩ and |1⟩, where the hyperfine ground state (i.e., the lower energy state of the $^2S_{1/2}$ hyperfine states) is chosen to represent |0⟩. Hereinafter, the terms "hyperfine states," "internal hyperfine states," and "qubits" may be interchangeably used to represent |0⟩ and |1⟩. Each ion may be cooled (i.e., kinetic energy of the ion may be reduced) to near the motional ground state |0⟩$_m$ for any motional mode m with no phonon excitation (i.e., $n_{ph}=0$) by known laser cooling methods, such as Doppler cooling or resolved sideband cooling, and then the qubit state prepared in the hyperfine ground state |0⟩ by optical pumping. Here, |0⟩ represents the individual qubit state of a trapped ion whereas |0⟩$_m$ with the subscript m denotes the motional ground state for a motional mode m of a group 106 of trapped ions.

An individual qubit state of each trapped ion may be manipulated by, for example, a mode-locked laser at 355 nanometers (nm) via the excited $^2P_{1/2}$ level (denoted as |e⟩). As shown in FIG. 3, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{0e}$ with respect to the transition frequency $\omega_{0e}$ between |0⟩ and |e⟩, as illustrated in FIG. 3. A two-photon transition detuning frequency δ includes adjusting the amount of energy that is provided to the trapped ion by the first and second laser beams, which when combined is used to cause the trapped ion to transfer between the hyperfine states |0⟩ and |1⟩. When the one-photon transition detuning frequency Δ is much larger than a two-photon transition detuning frequency (also referred to simply as "detuning frequency") $\delta=\omega_1-\omega_2-\omega_{01}$ (hereinafter denoted as ±μ, μ being a positive value), single-photon Rabi frequencies $\Omega_{02}(t)$ and $\Omega_{1e}(t)$ (which are time-dependent, and are determined by amplitudes and phases of the first and second laser beams), at which Rabi flopping between states |0⟩ and |e⟩ and between states |1⟩ and |e⟩ respectively occur, and a spontaneous emission rate from the excited state |e⟩, Rabi flopping between the two hyperfine states |0⟩ and |1⟩ (referred to as a "carrier transition") is induced at the two-photon Rabi frequency Ω(t). The two-photon Rabi frequency Ω(t) has an intensity (i.e., absolute value of amplitude) that is proportional to $\Omega_{0e}\Omega_{1e}/2\Delta$, where $\Omega_{0e}$ and $\Omega_{1e}$ are the single-photon Rabi frequencies due to the first and second laser beams, respectively. Hereinafter, this set of non-copropagating laser beams in the Raman configuration to manipulate internal hyperfine states of qubits (qubit states) may be referred to as a "composite pulse" or simply as a "pulse," and the resulting time-dependent pattern of the two-photon Rabi frequency Ω(t) may be referred to as an "amplitude" of a pulse or simply as a "pulse," which are illustrated and further described below. The detuning frequency $\delta=\omega_1-\omega_2-\omega_{01}$ may be referred to as detuning frequency of the composite pulse or detuning frequency of the pulse. The amplitude of the two-photon Rabi frequency Ω(t), which is determined by amplitudes of the first and second laser beams, may be referred to as an "amplitude" of the composite pulse.

It should be noted that the particular atomic species used in the discussion provided herein is just one example of atomic species which have stable and well-defined two-level energy structures when ionized and an excited state that is optically accessible, and thus is not intended to limit the possible configurations, specifications, or the like of an ion trap quantum processor according to the present disclosure. For example, other ion species include alkaline earth metal ions ($Be^+$, $Ca^+$, $Sr^+$, Mg+, and $Ba^+$) or transition metal ions ($Zn^+$, $Hg^+$, $Cd^+$).

Entanglement Formation

Figure 4A:
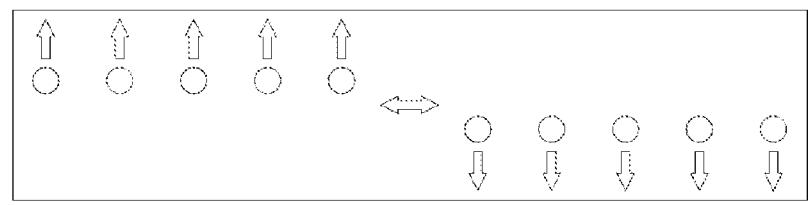
FIGS. 4A, 4B, and 4C depict a few schematic collective transverse motional mode structures of a chain of five trapped ions.
Figure 4B:
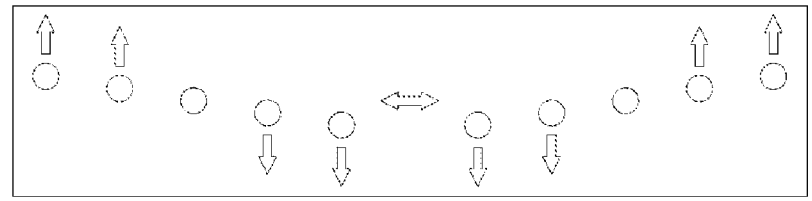
Figure 4C:
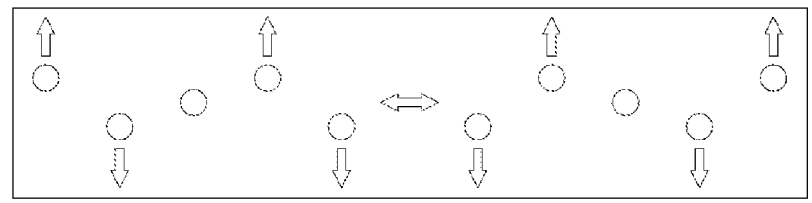

FIGS. 4A, 4B, and 4C depict a few schematic structures of collective transverse motional modes (also referred to simply as "motional mode structures") of a group 106 of five trapped ions, for example. Here, the confining potential due to a static voltage $V_S$ applied to the end-cap electrodes 210 and 212 is weaker compared to the confining potential in the radial direction. The collective motional modes of the group 106 of trapped ions in the transverse direction are determined by the Coulomb interaction between the trapped ions combined with the confining potentials generated by the ion trap 200. The trapped ions undergo collective transversal motions (referred to as "collective transverse motional modes," "collective motional modes," or simply "motional modes"), where each mode has a distinct energy (or equivalently, a frequency) associated with it. A motional mode having the m-th lowest energy is hereinafter referred to as $|n_{ph}\rangle$, where $n_{ph}$ denotes the number of motional quanta (in units of energy excitation, referred to as "phonons") in the motional mode, and the number of motional modes M in a given transverse direction is equal to the number of trapped ions in the group 106. FIGS. 4A-4C schematically illustrates examples of different types of collective transverse motional modes that may be experienced by five trapped ions that are positioned in a group 106. FIG. 4A is a schematic view of a common motional mode $|n_{ph}\rangle_M$ having the highest energy, where M is the number of motional modes. In the common motional mode $|n\rangle_M$, all ions oscillate in phase in the transverse direction. FIG. 4B is a schematic view of a tilt motional mode $|n_{ph}\rangle_{M-1}$ which has the second highest energy. In the tilt motional mode, ions on opposite ends move out of phase in the transverse direction (i.e., in opposite directions). FIG. 4C is a schematic view of a higher-order motional mode $|n_{ph}\rangle_{M-3}$ which has a lower energy than that of the tilt motional mode $|n_{ph}\rangle_{M-1}$, and in which the ions move in a more complicated mode pattern.

It should be noted that the particular configuration described above is just one among several possible examples of a trap for confining ions according to the present disclosure and does not limit the possible configurations, specifications, or the like according to the present disclosure. For example, the geometry of the electrodes is not limited to the hyperbolic electrodes described above. In other examples, a trap that generates an effective electric field causing the motion of the ions in the radial direction as harmonic oscillations may be a multi-layer trap in which several electrode layers are stacked and an RF voltage is applied to two diagonally opposite electrodes, or a surface trap in which all electrodes are located in a single plane on a chip. Furthermore, a trap may be divided into multiple segments, adjacent pairs of which may be linked by shuttling one or more ions, or coupled by photon interconnects. A trap may also be an array of individual trapping regions arranged closely to each other on a micro-fabricated ion trap chip, such as the one described above. In some embodiments, the quadrupole potential has a spatially varying DC component in addition to the RF component described above.

Figure 5A:
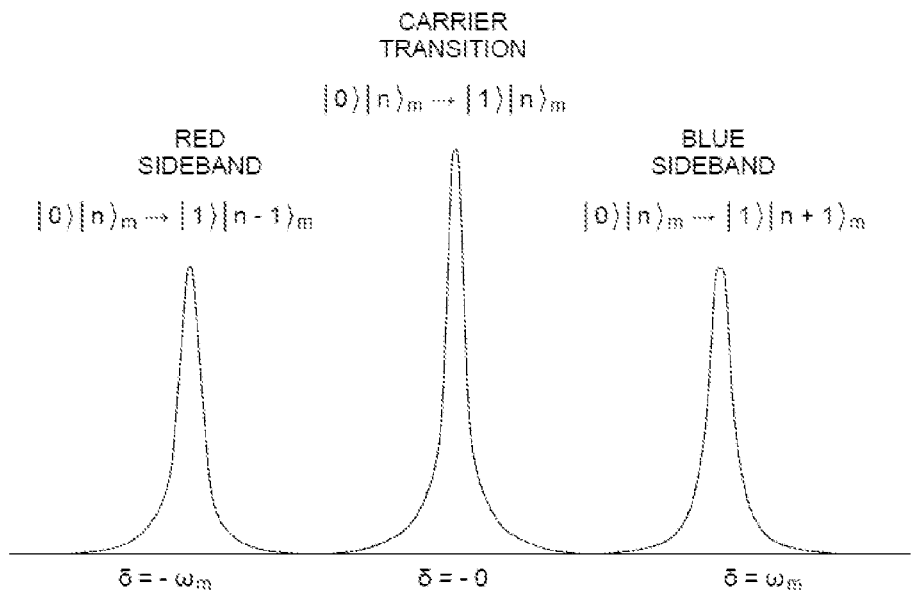
FIGS. 5A and 5B depict schematic views of motional sideband spectrum of each ion and a motional mode according to one embodiment.
Figure 5B:
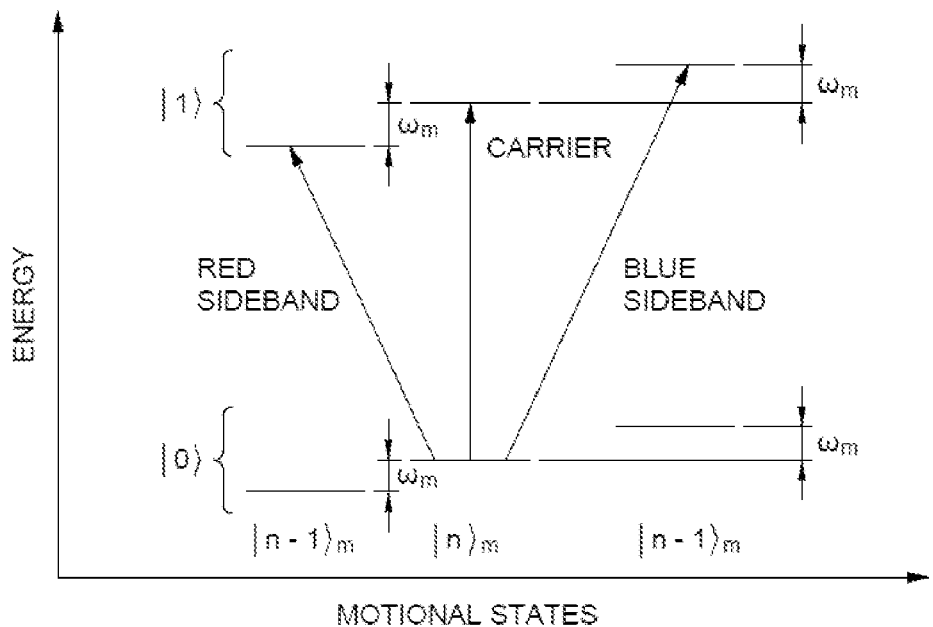

In an ion trap quantum computer, the motional modes may act as a data bus to mediate entanglement between two qubits and this entanglement is used to perform an entangling gate (referred to as a "XX gate") between the two qubits. That is, each of the two qubits is entangled with the motional modes, and then the entanglement is transferred to an entanglement between the two qubits by using motional sideband excitations, as described below. FIGS. 5A and 5B schematically depict views of a motional sideband spectrum for an ion in the group 106 in a motional mode $|n_{ph}\rangle_M$ having frequency $\omega_m$ according to one embodiment. As illustrated in FIG. 5B, when the detuning frequency of the composite pulse is zero (i.e., a frequency difference between the first and second laser beams is tuned to the carrier frequency, $\delta=\omega_1-\omega_2-\omega_{01}=0$), simple Rabi flopping between the qubit states $|0\rangle$ and $|1\rangle$ (carrier transition) occurs. When the detuning frequency of the composite pulse is positive (i.e., the frequency difference between the first and second laser beams is tuned higher than the carrier frequency, $\delta=\omega_1-\omega_2-\omega_{01}=\mu>0$, referred to as a "blue sideband"), Rabi flopping between combined qubit-motional states $|0\rangle|n_{ph}\rangle_m$ and $|1\rangle|n_{ph}+1\rangle_m$ occurs (i.e., a transition from the m-th motional mode with $n_{ph}$-phonon excitations denoted by $|n_{ph}\rangle_m$ to the m-th motional mode with ($n_{ph}+1$)-phonon excitations denoted by $|n_{ph}+1\rangle_m$ occurs when the qubit state $|0\rangle$ flips to $|1\rangle$). When the detuning frequency of the composite pulse is negative (i.e., the frequency difference between the first and second laser beams is tuned lower than the carrier frequency by the frequency $\omega_m$ of the motional mode $|n_{ph}\rangle_m$, $\delta=\omega_1-\omega_2-\omega_{01}=-\mu>0$, referred to as a "red sideband"), Rabi flopping between combined qubit-motional states $|0\rangle|n_{ph}\rangle_m$ and $|1\rangle|n_{ph}-1\rangle_m$ occurs (i.e., a transition from the motional mode $|n_{ph}\rangle_m$ to the motional mode $|n_{ph}-1\rangle_m$ with one less phonon excitations occurs when the qubit state $|0\rangle$ flips to $|1\rangle$).

By the application of pulses on the sidebands for duration τ (referred to as a "gate duration"), having amplitudes $\Omega^{(i)}$ and $\Omega^{(j)}$ and detuning frequency μ, an entangling gate operation (XX gate) between a pair of i-th and j-th qubits, $XX_{ij}(\theta_{ij})$ $$|0\rangle_i|0\rangle_j \rightarrow \cos(\theta_{ij})|0\rangle_i|0\rangle_j - i\sin(\theta_{ij})|1\rangle_i|1\rangle_j$$

$$|0\rangle_i|1\rangle_j \rightarrow \cos(\theta_{ij})|0\rangle_i|1\rangle_j - i\sin(\theta_{ij})|1\rangle_i|0\rangle_j$$

$$|1\rangle_i|0\rangle_j \rightarrow -i\sin(\theta_{ij})|0\rangle_i|1\rangle_j + \cos(\theta_{ij})|1\rangle_i|0\rangle_j$$

$$|1\rangle_i|1\rangle_j \rightarrow -i\sin(\theta_{ij})|0\rangle_i|0\rangle_j + \cos(\theta_{ij})|1\rangle_i|1\rangle_j$$

can be performed, where $\theta_{ij}$ is an entangling interaction between the i-th and j-th qubits defined as, $$\theta_{ij} = -4 \sum_{m=1}^{M} \eta_m^{(i)} \eta_m^{(j)} \int_0^\tau dt_2 \int_0^{t_2} dt_1 \Omega^{(i)}(t_2) \Omega^{(j)}(t_1) \cos(\mu t_2) \cos(\mu t_1) \sin[\omega_m(t_2 - t_1)],$$

$n_m^{(i)}$ is the Lamb-Dicke parameter that quantifies the coupling strength between the i-th qubit and the m-th motional mode having the frequency $\omega_m$, and M is the number of the motional modes (equal to the number N of ions in the group 106). In the example shown above, the amplitudes $\Omega^{(i)}$ and $\Omega^{(j)}$ are modulated. In other embodiments, detuning frequency μ can also be modulated to achieve a desired entangling gate operation (XX gate) between a pair of i-th and j-th qubits, $XX_{ij}(\theta_{ij})$.

This entangling gate operation can be simultaneously performed on arbitrary pairs of qubits, by appropriately adjusting the amplitudes $\omega^{(i)}$, and such gates are referred to as efficient arbitrary simultaneous entangling (EASE) gates hereinafter and defined as EASE $(\vec{\theta}) = \hbar_{i>j} XX_{ij}(\theta_{ij})$. It should be noted that the EASE gate that can be implemented by the methods described herein is not limited in this particular form. For example, an EASE gate can be in a form: EASE $(\vec{\phi}, \vec{\theta}) = \Pi_{i>j} \exp(-i\sigma_{\phi i}^{(i)} \sigma_{\phi j}^{(j)} \theta_{ij}/2)$, where $\sigma_{\phi i}^{(i)} = \cos(\phi_i) \sigma_x^{(i)} + \sin(\phi_i) \sigma_y^{(i)}$ us a Pauli operator, defined over a vector that points to the equator on a Bloch spare with azimuthal angle $\phi_i$, acting on qubit i and free parameters $\theta_{ij}$ are the entanglement coupling between qubit i and j.

The EASE gates, combined with appropriate single-qubit gates, can be used to implement various two-qubit gate operations, such as ZZ gate, controlled Z (CZ) gates, controlled not (CNOT) gates, and SWAP gates, over arbitrary pairs of qubits, individually or simultaneously. A ZZ gate $ZZ_{ij}(\theta_{ij})$ over i-th and j-th qubits adds a phase $e^{i\theta ij(x \oplus y)}$ to a two-qubit state $|x\rangle_i |y\rangle_j$ (x,y={0,1}) depending on the logical exclusive OR (XOR) of the i-th and j-th qubits, $$(x \oplus y): |x\rangle_i |y\rangle_j \xrightarrow{ZZ_{ij}(\theta_{ij})} e^{i\theta_{ij}(x \oplus y)} |x\rangle_i |y\rangle_j$$

up to a global phase. A CZ gate operation conditioned on i-th (control bit) and targeted on j-th qubit (target bit) adds a phase $e^{i\pi}(=-1)$ to a two-qubit state $|x\rangle_i |y\rangle_j$ (x, y={0,1}) only if both of the i-th and j-th qubits are in state $$|1\rangle: |x\rangle_i |y\rangle_j \xrightarrow{CZ} (-1)^{x \cdot y} |x\rangle_i |y\rangle_j,$$

where x·y is the logical AND of the i-th and j-th qubits. A CNOT gate operation conditioned on i-th qubit (control bit) and targeted on j-th qubit (target bit) inverts the j-th qubit (target bit) if the i-th qubit (control bit) in state $|1\rangle$, and leaves both the i-th and j-th qubits unchanged otherwise, thus transforming a two-qubit state $|x\rangle_i |y\rangle_j$ (x, y={0,1}) to a two-qubit state $$|x\rangle_i |x \oplus y\rangle_j: |x\rangle_i |y\rangle_j \xrightarrow{CNOT} |x\rangle_i |x \otimes y\rangle_j,$$

where x⊕y is the logical exclusive OR (XOR) of the i-th and j-th qubits. A SWAP gate operation between i-th and j-th qubits swaps the i-th and j-th qubits, thus transforming a two-qubit state $|x\rangle_i |y\rangle_j$ (x, y={0,1}) to a two-qubit state $$|y\rangle_i |x\rangle_j: |x\rangle_i |y\rangle_j \xrightarrow{SWAP} |y\rangle_i |x\rangle_j.$$

Single qubit operations that are used in conjunction with the EASE gates include rotation gates X(θ), Y(θ), and Z(θ), which each transforms states $|0\rangle$ and $|1\rangle$ of the qubit according to $$X(\theta) := \begin{pmatrix} \cos(\theta/2) & -i\sin(\theta/2) \\ -i\sin(\theta/2) & \cos(\theta/2) \end{pmatrix},$$

$$Y(\theta) := \begin{pmatrix} \cos(\theta/2) & \sin(\theta/2) \\ -\sin(\theta/2) & \cos(\theta/2) \end{pmatrix}, \text{ and } Z(\theta) := \begin{pmatrix} e^{-i\theta/2} & 0 \\ 0 & e^{i\theta/2} \end{pmatrix},$$

respectively, Hadamard gate $$H := \frac{1}{\sqrt{2}} \begin{pmatrix} 1 & 1 \\ 1 & -1 \end{pmatrix},$$

a phase gates $$S := \begin{pmatrix} 1 & 0 \\ 0 & i \end{pmatrix},$$

and an inverse phase gate $$S^{-1} := \begin{pmatrix} 1 & 0 \\ 0 & -i \end{pmatrix}.$$

Construction of Quantum Circuits by Ease Gates

In quantum computation, a quantum algorithm is selected and decomposed into series of quantum circuits, including single-qubit gate operations, two-qubit gate operations, and multiple qubit gate operations, that are implemented on a quantum processor. In some embodiments, quantum algorithms are decomposed using commonly used quantum circuits (i.e., certain sequences of quantum gate operations). Such quantum circuits include Clifford circuits (also referred to as "stabilizer circuits"), multi-controlled NOT gates, qubit permutation gates, controlled SWAP gates, and controlled permutation gates. For example, Clifford circuits are well known as circuits that can be efficiently simulated by classical computers. Quantum algorithms are often decomposed in terms of Clifford circuits and non-Clifford circuits. The multi-controlled NOT gates are used for running quantum algorithms, including Grover's algorithm and quantum approximate optimization algorithms, implementing reversible logics, such as Reed-Müller kind, and simulating strongly-interacting materials. The quantum permutation gates are used for running quantum algorithms, including string matching algorithm, and simulating interacting materials using the quantum enhanced Ewald method. The controlled SWAP gates are used for running quantum algorithms, including discrete logarithm algorithm and Shor's algorithm. The controlled permutation gates are used for running quantum algorithms, including quantum string matching algorithm.

A Clifford circuit acting on n qubits is a quantum circuit that can be composed solely of a CZ gate layer (i.e., a combination of CZ gates over one or more pairs of qubits among the n qubits), a CNOT gate layer (i.e., a combination of CNOT gates over one or more pairs of qubits among the n qubits), a Hadamard gate layer (i.e., a combination of Hadamard H gates on one or more qubits among the n qubits), and a phase gate layer (i.e., a combination of phase S gates on one or more qubits among the n qubits). It has been shown an arbitrary Clifford circuit is decomposed in a normal form of H-S-CZ-CNOT-H-CZ-S-H, where H, S, CZ, and CNOT, which stand for a Hadamard gate layer, a phase gate layer, a CZ gate layer, and a CNOT gate layer, respectively. Since the Hadamard gates H and the phase gates S are single-qubit gate operations and can be simultaneously and efficiently implemented, CZ gate layers and CNOT gate layers that are used in decomposition of Clifford circuits, along with the multi-controlled NOT gates and the qubit permutation gates are constructed efficiently by the EASE gates in the embodiments described herein.

In the description below, "construction" of a circuit that implements a gate operation or a layer of gate operations refers to decomposing, by a classical computer (e.g., a digital computer), a given gate operation or a layer of gate operations into one or more EASE gates and single-qubit gates, and computing, by the classical computer, a sequence of one or more EASE gates and single-qubit gates that will be implemented on a quantum processor as a part of running of a selected quantum algorithm to complete a computational operation. Using a gate operation and a layer of gate operations that are constructed efficiently by the methods described herein, an overall quantum computation can be performed efficiently.

CZ Gate Layer

As described above, a CZ gate layer acting on n qubits is a combination of one or more CZ gates each over a pair of qubits among the n qubits. In the description below, pairs of qubits each over which a CZ gate is included in the CZ gate layer are referred to as "participating pairs" and qubits in the participating pairs are referred as "participating qubits." For example, for a CZ gate layer including CZ gates over pairs of qubits (1, 2), (1, 4), (3, 6), and (3, 8), where the qubits are numbered as 0, 1, ..., n-1, the participating pairs are (1, 2), (1, 4), (3, 6), and (3, 8) and the participating qubits are 1, 2, 3, 4, 6, and 8.

Figure 6:
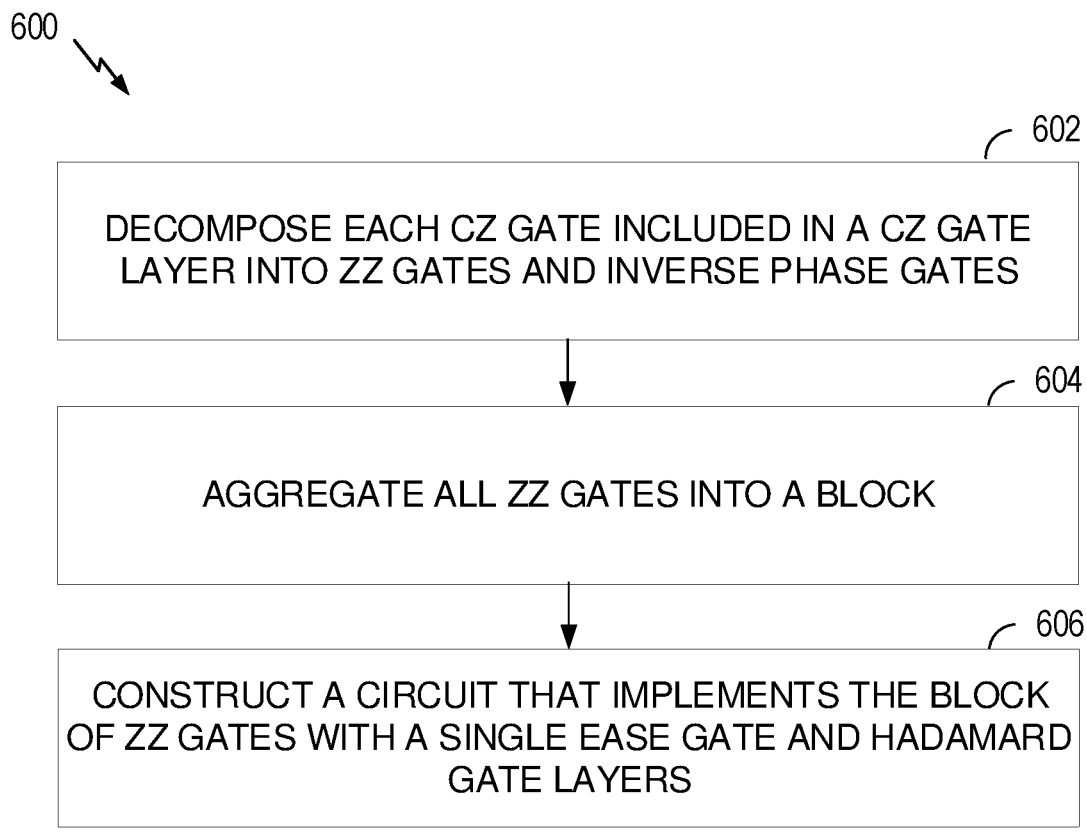
FIG. 6 depicts a flowchart illustrating a method used to construct a circuit that implements a CZ gate layer acting on n qubits, according to one embodiment.

FIG. 6 depicts a flowchart illustrating a method 600 to construct a circuit that implements a CZ gate layer acting on n qubits, according to one embodiment. The method 600 starts with block 602, in which each of the one or more CZ gates included in the CZ gate layer is decomposed, by the classical computer, into a combination of a ZZ gate and inverse phase $S^{-1}$ gates up to a global phase. In block 602, a CZ gate over a pair of i-th and j-th qubits $$(CZ_{ij}: |x\rangle_i|y\rangle_j \overset{CZ}{\to} (-1)^{x \cdot y}|x\rangle_i|y\rangle_j)$$

is decomposed into a ZZ gate over the i-th and j-th qubits $ZZ_{ij}(\theta_{ij})$ where $$\theta_{ij} = \frac{\pi}{2},$$

and the inverse phase $S^{-1}$ gates on both of the i-th and j-th qubits. This decomposition is repeated for the one or more CZ gates over all of the participating pairs included in the CZ gate layer.

In block 604, the ZZ gates over all of the participating pairs (i.e., orders of the ZZ gates and the inverse phase $S^{-1}$ gates are changed, such that all of the ZZ gates are concatenated) are aggregated in a single block by the classical computer. This operation in block 604 is possible since a ZZ gate and an inverse phase $S^{-1}$ gate commute (i.e., the order of a ZZ gate and an inverse phase $S^{-1}$ gate can be interchanged without affecting an outcome of the gate operations). Thus, the CZ layer is now decomposed into a single block of ZZ gates $\Pi_{i,j} ZZ_{ij}(\theta_{ij})$ where $$\theta_{ij} = \frac{\pi}{2}$$

for all participating pairs (i,j) and a layer of the inverse phase $S^{-1}$ gates.

In block 606, a circuit that implements the single block of ZZ gates ($\Pi_{i,j} ZZ_{ij}(\theta_{ij})$) is constructed by the classical computer. The circuit includes a single EASE gate and Hadamard gate H layers, since the single block of ZZ gates ($\Pi_{i,j} ZZ_{ij}(\theta_{ij})$) can be implemented by conjugating an EASE gate, EASE ($\vec{\theta}$)=$\Pi_{i,j} XX_{ij}(\theta_{ij})$, where $$\theta_{ij} = \frac{\pi}{2}$$

for participating pairs (i,j) with a Hadamard gate layer (i.e., applying a Hadamard gate layer before and after the EASE gate). The Hadamard gate layer includes Hadamard gates on all participating qubits.

Thus, the overall circuit that implements a CZ gate layer including CZ gates over participating pairs (i,j) of qubits includes a Hadamard gate layer including Hadamard gates on all participating qubits, a single EASE gate, EASE ($\vec{\theta}$)=$\Pi_{i,j} XX_{ij}(\theta_{ij})$, where $$\theta_{ij} = \frac{\pi}{2}$$

for participating pairs (i,j), another Hadamard gate layer including Hadamard gates on all participating qubits, an inverse phase layer including inverse phase $S^{-1}$ gates aggregated on the participating qubits. Thus, the method 600 provides improved efficiency over the conventional method using a universal gate set including single-qubit gates and two-qubit gates that requires $O(n^2)$ two-qubit gates.

CNOT Gate Layer

A CNOT gate layer acting on n qubits is a combination of one or more CNOT gates each over a pair of qubits among the n qubits. Similarly to the description above about a CZ gate layer, pairs of qubits each over which a CNOT is included in the CNOT gate layer are referred to as "participating pairs" and qubits in the participating pairs are referred as "participating qubits." In general, a CNOT gate layer can be written as a linear transformation of an input set of Boolean variables $$b = \begin{pmatrix} b_0 \\ b_1 \\ \vdots \\ b_{n-1} \end{pmatrix}$$

to an output set of Boolean variables $$b' = \begin{pmatrix} b'_0 \\ b'_1 \\ \vdots \\ b'_{n-1} \end{pmatrix}$$

by an n×n transformation matrix $M_{CNOT}$. Each Boolean variable $b_i$ (i=0,1, ..., n-1) is represented by n qubits. In the embodiments described herein, two methods of constructing a circuit that implements a CNOT gate layer, one without ancillary qubits, and the other with ancillary qubits, are provided.

Figure 7:
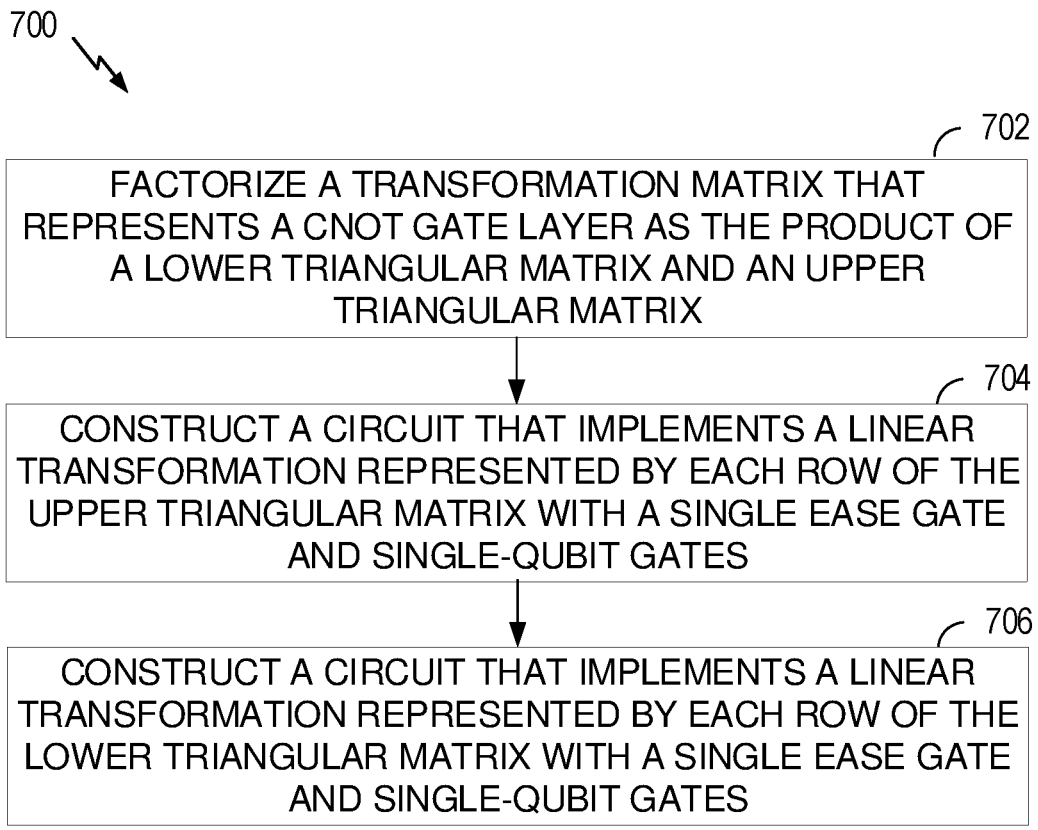
FIG. 7 depicts a flowchart illustrating a method used to construct a circuit that implements a CNOT gate layer acting on n qubits, without ancillary qubits, according to one embodiment.

FIG. 7 depicts a flowchart illustrating a method 700 to construct a circuit that implements a CNOT gate layer acting on n qubits, without ancillary qubits, according to one embodiment. The method 700 starts with a block 702, in which the transformation matrix $M_{CNOT}$ that represents a CNOT gate layer is factorized as the product of an n×n lower triangular matrix $$L = \begin{pmatrix} t_0^{(0)} & 0 & \cdots & 0 \\ t_1^{(0)} & t_1^{(1)} & \cdots & 0 \\ \vdots & \vdots & \ddots & \vdots \\ t_{n-1}^{(0)} & t_{n-1}^{(1)} & \cdots & t_{n-1}^{(n-1)} \end{pmatrix}$$

and an n×n upper triangular matrix $$U = \begin{pmatrix} s_0^{(0)} & s_1^{(0)} & \cdots & s_{n-1}^{(0)} \\ 0 & s_1^{(1)} & \cdots & s_{n-1}^{(1)} \\ \vdots & \vdots & \ddots & \vdots \\ 0 & 0 & \cdots & s_{n-1}^{(n-1)} \end{pmatrix},$$

by the classical computer. This factoring of the matrix $M_{CNOT}$ is performed by the lower-upper (LU) decomposition method well known in the art, and can be performed efficiently for this instance with the time scaling of $O(n^3)$ by the classical computer.

In block 704, a circuit that implements a linear transformation represented by each row of the upper triangular matrix U is constructed by the classical computer. The i-th row of the upper triangular matrix U (0 ... $s_i^{(i)}$ $s_{i+1}^{(i)}$ ... $s_{n-1}^{(i)}$) corresponds modulo 2 addition of Boolean variables $b_j$ (j=i+1, ..., n-1) to the i-th Boolean variable $b_i$, if $s_j^{(i)}$=1, which corresponds to a CNOT gate controlled on the j-th Boolean variables $b_j$ (j=i+1, ..., n-1) and targeted on the i-th Boolean variable $b_i$, where $s_j^{(i)}$=1. This set of CNOT gates can be implemented by a single EASE gate EASE $(\vec{\theta})=\Pi_{i,j}$ exp $[-i\sigma_x^{(i)} \sigma_x^{(j)} \theta_{ij}]$, where $$i < j, \theta_{ij} = \frac{\pi}{2} s_j^{(i)}$$

along with appropriate single-qubit gates. This construction of a circuit is repeated to implement all n rows of the upper triangular matrix U. Thus, the circuit constructed in block 704 includes n EASE gates and single-qubit gates.

In block 706, a circuit that implements a linear transformation represented by each row of the lower triangular matrix L is constructed by the classical computer. The i-th row of the lower triangular matrix L ($t_0^{(i)}$ ... $t_{i-1}^{(i)}$ $t_i^{(i)}$ ... 0) corresponds modulo 2 addition of Boolean variables $b_j$ (j=0, i-1) to the i-th Boolean variable $b_i$, if $t_j^{(i)}$=1, which corresponds to a CNOT gate controlled on the j-th Boolean variables $b_j$ (j=0, ..., i-1) targeted on the i-th Boolean variable $b_i$, where $t_j^{(i)}$=1. This set of CNOT gates can be implemented by a single EASE gate EASE $(\vec{\theta})=\Pi_{i,j}$ exp $[-i\sigma_x^{(i)} \sigma_x^{(j)} \theta_{ij}]$, where $$i > j, \theta_{ij} = \frac{\pi}{2} t_j^{(i)}$$

along with appropriate single-qubit gates. This construction of a circuit is repeated to implement all n rows of the lower triangular matrix L. Thus, the circuit constructed in block 706 includes n EASE gates and single-qubit gates.

Thus, the overcall circuit that implements a CNOT gate layer acting on n qubits, without ancillary qubits, includes 2n EASE gates and single-qubit gates. Thus, the method 700 provides improved efficiency over the conventional method using a universal gate set including single-qubit gates and two-qubit gates that requires $\Omega(n^2/\log(n))$ two-qubit gates known in the art.

Figure 8:
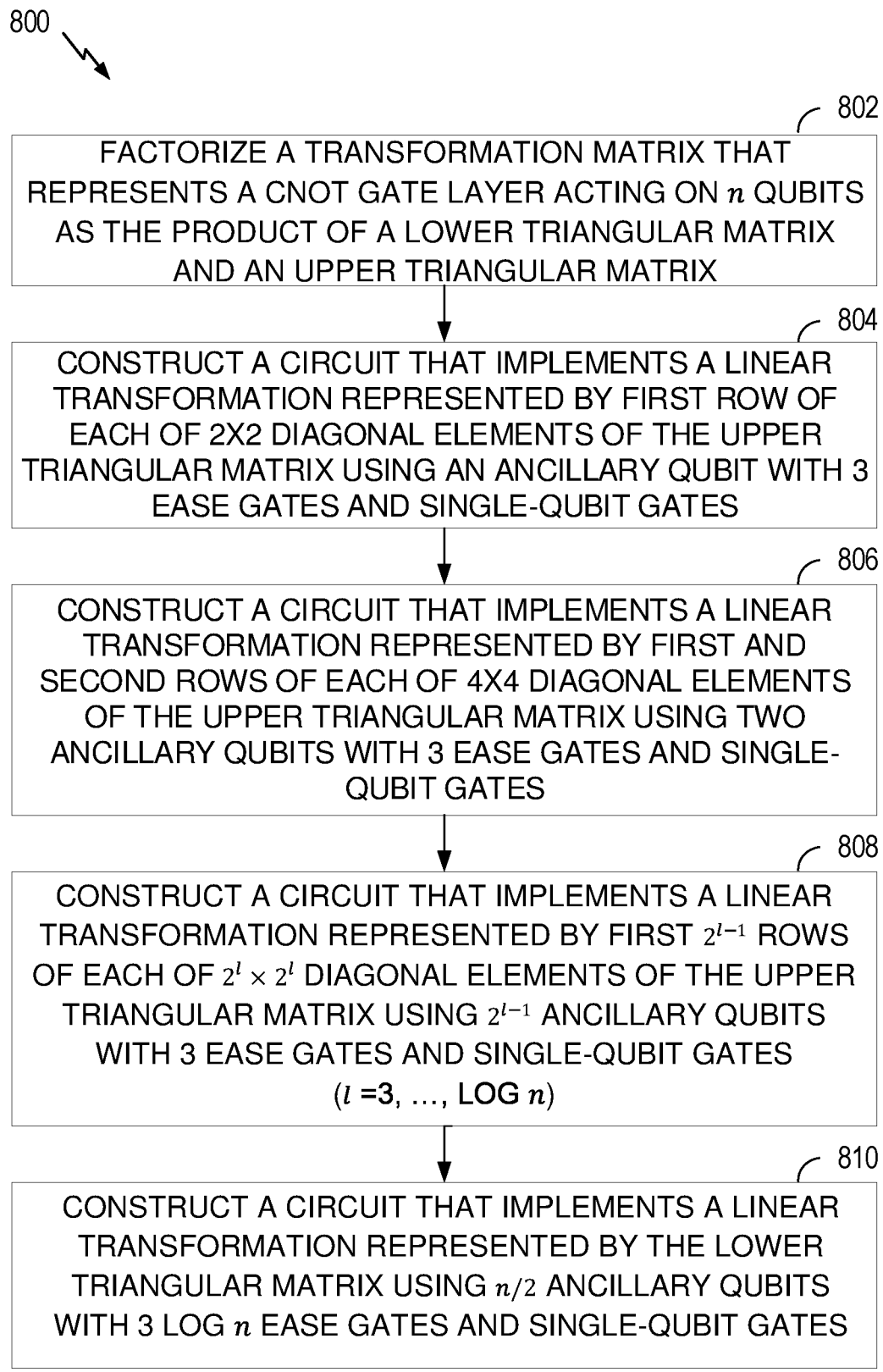
FIG. 8 depicts a flowchart illustrating a method used to construct a circuit that implements a CNOT gate layer acting on n qubits, with n/2 ancillary qubits, according to one embodiment.

FIG. 8 depicts a flowchart illustrating a method 800 to construct a circuit that implements a CNOT gate layer acting on n qubits, with n/2 ancillary qubits, according to one embodiment. In the example described herein, n is assumed to be $2^m$, where m is a natural number, for simplicity. However, one with the ordinary skill in the art would readily know that the method 800 can be applied to a case where n is an arbitrary number. The method 800 starts with block 802, in which the transformation matrix $M_{CNOT}$ that represents a CNOT gate layer is factorized as the product of an n×n lower triangular matrix $$L = \begin{pmatrix} t_0^{(0)} & 0 & \cdots & 0 \\ t_1^{(0)} & t_1^{(1)} & \cdots & 0 \\ \vdots & \vdots & \ddots & \vdots \\ t_{n-1}^{(0)} & t_{n-1}^{(1)} & \cdots & t_{n-1}^{(n-1)} \end{pmatrix}$$

and an n×n upper triangular matrix $$U = \begin{pmatrix} s_0^{(0)} & s_1^{(0)} & \cdots & s_{n-1}^{(0)} \\ 0 & s_1^{(1)} & \cdots & s_{n-1}^{(1)} \\ \vdots & \vdots & \ddots & \vdots \\ 0 & 0 & \cdots & s_{n-1}^{(n-1)} \end{pmatrix},$$

by the classical computer. This factoring of the matrix $M_{CNOT}$ is performed by the lower-upper (LU) decomposition method well known in the art, and can be performed efficiently with the time scaling of $O(n^3)$ by the classical computer. This decomposition process in block 802 is the same as that in block 702 of the method 700 described above.

In block 804, a circuit that implements a linear transformation represented by the first row of each of 2×2 block diagonal elements $$\begin{pmatrix} s_i^{(i)} & s_{i+1}^{(i)} \\ 0 & s_{i+1}^{(i+1)} \end{pmatrix} (i = 0, 2, 4, \ldots)$$

of the upper triangular matrix U using one ancillary qubit is constructed by the classical computer. The first row of the upper triangular matrix U ($s_i^{(i)}$ $s_{i+1}^{(i)}$) corresponds modulo 2 addition of the Boolean variable $b_{i+1}$ to the i-th Boolean variable $b_i$, if $s_{i+1}^{(i)}=1$. In the example described herein, the circuit includes a first CNOT gate conditioned on the Boolean variable $b_{i+1}$ and targeted on the ancillary qubit that is prepared in state $|0\rangle$. This first CNOT gate temporarily copies the Boolean variable $b_{i+1}$ to the ancillary qubit. The circuit subsequently includes a second CNOT gate conditioned on the ancillary qubit and targeted on the Boolean variable $b_i$. This second CNOT gate performs modulo 2 addition of the Boolean variable $b_{i+1}$ to the Boolean variable $b_i$. The circuit then includes a third CNOT gate that is the same as the first CNOT gate. This third CNOT gate transforms the ancillary qubit back to state $|0\rangle$ such that this ancillary qubit can be reused in the following steps. Each of these three CNOT gates, appearing for i=0, 2, 4, . . . , can be implemented simultaneously by a single EASE gate along with single-qubit gates. Thus, the circuit constructed in block 804 includes three EASE gates and single-qubit gates.

In block 806, a circuit including that implements a linear transformation represented by 2×2 off-diagonal elements of each 4×4 block diagonal elements $$\begin{pmatrix} s_i^{(i)} & s_{i+1}^{(i)} & s_{i+2}^{(i)} & s_{i+3}^{(i)} \\ 0 & s_{i+1}^{(i+1)} & s_{i+2}^{(i+1)} & s_{i+3}^{(i+1)} \\ 0 & 0 & s_{i+2}^{(i+2)} & s_{i+3}^{(i+2)} \\ 0 & 0 & 0 & s_{i+3}^{(i+3)} \end{pmatrix} (i = 0, 4, 8, \ldots)$$

of the upper triangular matrix U using two ancillary qubits is constructed by the classical computer. The circuit constructed in block 802 already implements linear transformations represented by the two 2×2 block diagonal elements $$\begin{pmatrix} s_i^{(i)} & s_{i+1}^{(i)} \\ 0 & s_{i+1}^{(i+1)} \end{pmatrix} \text{ and } \begin{pmatrix} s_{i+2}^{(i+2)} & s_{i+3}^{(i+2)} \\ 0 & s_{i+3}^{(i+3)} \end{pmatrix}.$$

Thus, the circuit to construct in block 806 implements linear transformations represented by the 2×2 off-diagonal elements $$\begin{pmatrix} s_{i+2}^{(i)} & s_{i+3}^{(i)} \\ s_{i+2}^{(i+1)} & s_{i+3}^{(i+1)} \end{pmatrix}.$$

These linear transformations correspond to modulo 2 addition of Boolean variables $b_j$ (j=i+2, i+3) to the i-th Boolean variables $b_i \oplus s_{i+1}^{(i)} b_{i+1}$, if $s_j^{(i)}=1$, and modulo 2 addition of Boolean variables $b_j$ (j=i+2, i+3) to the (i+1)-th Boolean variable $b_{i+1}$, if $s_j^{(i)}=1$, which corresponds to a CNOT gate controlled on the j-th Boolean variables $b_j$ (j=i+1, . . . , n-1) targeted on the (i+1)-th Boolean variable $b_{i+1}$, where $s_j^{(i+1)}=1$. Thus, similarly to block 804, the circuit includes a first set of a first set of CNOT gates, conditioned on the Boolean variable $b_{i+2} \oplus s_{i+3}^{(i+2)} b_{i+3}$ and $b_{i+3}$ and targeted on the first ancillary qubit that is prepared in state $|0\rangle$, and a second set of a first set of CNOT gates, conditioned on the Boolean variables $b_{i+2} \oplus s_{i+3}^{(i+2)} b_{i+3}$ and $b_{i+3}$ and targeted on the second ancillary qubit that is prepared in state $|0\rangle$. This first set of CNOT gates temporarily copies the Boolean variables $s_{i+2}^{(i)} b_{i+2} \oplus s_{i+3}^{(i)} b_{i+3}$ and $s_{i+2}^{(i+1)} b_{i+2} \oplus s_{i+3}^{(i+1)} b_{i+3}$ to the first ancillary qubit and the second ancillary qubits, respectively. The circuit subsequently includes a second set of CNOT gates, a CNOT gate conditioned on the first ancillary qubit and targeted on the Boolean variable $b_i \oplus s_{i+1}^{(i)} b_{i+1}$, a CNOT gate conditioned on the second ancillary qubit and targeted on the Boolean variable $b_{i+1}$. This second set of CNOT gates performs modulo 2 addition of the Boolean variable $b_i \oplus s_{i+1}^{(i)} b_{i+1}$ to the Boolean variable $s_{i+2}^{(i)} b_{i+2} \oplus s_{i+3}^{(i)} b_{i+3}$, and modulo 2 addition of the Boolean variable $b_{i+1}$ to the Boolean variable $s_{i+2}^{(i+1)} b_{i+2} \oplus s_{i+3}^{(i+1)} b_{i+3}$. The circuit then includes a third set of CNOT gates that is the same as the first set of CNOT gates. This third set of CNOT gates transforms the first ancillary qubit and the second ancillary qubits back to state $|0\rangle$, such that these ancillary qubits can be reused in the following steps. Each of these three sets of CNOT gates can be implemented by a single EASE gate along with single-qubit gates. Thus, the circuit constructed in block 806 includes three EASE gates and single-qubit gates.

In block 808, a circuit that implements a linear transformation represented by the $2^{l-1} \times 2^{l-1}$ off-diagonal elements of each $2^l \times 2^l$ block diagonal elements (l=3,4, . . . , m=log n) of the upper triangular matrix U using $2^{l-1}$ ancillary qubits is constructed by the classical computer. The circuit includes a first set of CNOT gates each conditioned on the Boolean variable $b_j \oplus \oplus_{k > j} s_k^{(j)} b_k$ (j=i+$2^{l-1}$, i+$2^{l-1}$+1, . . . , i+$2^l$−1) and targeted on one of $2^{l-1}$ ancillary qubits that are each prepared in state $|0\rangle$. This first set of $2^{l-1}$ CNOT gates temporarily copies the Boolean variable $$\bigoplus_{j=i'+2^{l-1}}^{i'+2^l-1} s_j^{(i')} b_j (i' = i, i+1, \ldots, i+2^{l-1}-1)$$

to the ancillary qubits. The circuit subsequently includes a second set of CNOT gates, each conditioned on one of the ancillary qubits targeted on the Boolean variable $$b_j \oplus \bigoplus_{i' > j}^{2^{l-1}-1} s_{i'}^{(j)} b_{i'} (j = i, i+1, \ldots, i+2^{l-1}-1).$$

This second set of CNOT gates performs modulo 2 addition of the Boolean variable $$b_j \oplus \bigoplus_{i' > j}^{2^{l-1}-1} s_{i'}^{(j)} b_{i'}$$

to the Boolean variable $$\bigoplus_{j=i'+2^{l-1}}^{i'+2^l-1} s_j^{(i')} b_j.$$

The circuit then includes a third set of CNOT gates that is the same as the first set of CNOT gates. This third set of CNOT gates transforms the ancillary qubits back to state $|0\rangle$, such that these ancillary qubits can be reused in the following steps. Each of these sets of $2^{l-1}$ CNOT gates can be implemented simultaneously by a single EASE gate along with single-qubit gates. This step is repeated sequentially from l=3 to l=m (=log n). Thus, the circuit constructed in block 808 includes (m−2)×3 EASE gates and single-qubit gates.

In block 810, a circuit that implements a linear transformation represented by the lower triangular matrix L using n/2 ancillary qubits is constructed by the classical computer. The construction of the circuit in block 810 follows the steps in blocks 804-808. The circuit constructed in block 810 includes 3 log n (=3m) EASE gates and single-qubit gates.

Thus, the overcall circuit that implements a CNOT gate layer acting on n qubits, with n/2 ancillary qubits includes 6 log n (=6m) EASE gates and single-qubit gates. Thus, the method 800 provides improved efficiency over the conventional method using a universal gate set including single-qubit gates and two-qubit gates that requires $\Omega(n^2/\log(n))$ two-qubit gates.

Multi-Controlled Not Gates

A multi-controlled NOT gate (denoted as $C^{n-1}$ NOT gate, also referred to as Toffoli-n gate) acting on n qubits flips the value of a target bit if all of (n−1) qubits are in state $|0\rangle$. For example, a $C^2$ NOT gate (referred to as "Toffoli-3 gate" or simply as a "Toffoli gate") applied to two control bits and one target bit inverts the target bit only if both of the control bits are in state $|1\rangle$, and leaves all three qubits unchanged otherwise, thus transforming a three-qubit state $|x\rangle|y\rangle|z\rangle$ (x, y, z={0,1}) to a three-qubit state $$|x\rangle|y\rangle|(x \cdot y) \oplus z\rangle; |x\rangle|y\rangle|z\rangle \xrightarrow{Toffoli} |x\rangle|y\rangle|(x \cdot y) \oplus z\rangle.$$

A multi-controlled NOT gate can be simply obtained by conjugating a multi-controlled Z gate (denoted as a $C^{n-1}$ Z gate) by a Hadamard gate applied on the target qubit (i.e., applying a Hadamard gate on the target qubit before and after the $C^{n-1}$ Z gate). Thus, in the example described herein, methods to construct a $C^{n-1}$ NOT are provided.

In general, a $C^{n-1}$ Z gate transforms a n-qubit state $|b_0 b_1 \ldots b_{n-1}\rangle$ to $$w_{2^n}^{2^{n-1} \Pi_{j=0}^{n-1} b_j} |b_0 b_1 \ldots b_{n-1}\rangle,$$

where $\omega_{2^n}$ is defined as $$e^{i\frac{\pi}{2^{n-1}}}.$$

Using the equality, 2xy=x+y−(x⊕y), the exponent $2^{n-1} \Pi_{j=0}^{n-1} b_j$ can be expanded according to $$2^{n-1}\Pi_{j=0}^{n-1} b_j = \Sigma_{l=1}^n (-1)^{l-1} T_l,$$

where $T_l = \Sigma_{k=1}^{{}_nC_l} \oplus_{m=1}^l b_{c_l(k,m)}$ is the sum of all distinct length-l XOR patterns of input Boolean values $b_j$, and $c_l$(k, m) denotes the m-th qubit index that appears in the k-th length-l pattern, and ${}_nC_l$ is n choose l. Thus, the transformation by the $C^{n-1}$ Z gate can be written as to $$|b_0 b_1 \ldots b_{n-1}\rangle \to w_{2^n}^{\Sigma_{l=1}^n (-1)^{l-1} T_l} |b_0 b_1 \ldots b_{n-1}\rangle.$$

For example, a $C^2$ Z gate transforms a three-qubit state as $$|x\rangle|y\rangle|z\rangle \to w_8^{\Sigma_{l=1}^3 (-1)^{l-1} T_l} |x\rangle|y\rangle|z\rangle,$$

where $$w_8 = e^{i\frac{\pi}{4}},$$

$T_1$=x+y+z (linear terms), $T_2$=(x⊕y)+(y⊕z)+(z⊕x) (XOR patterns of length 2), and $T_3$=x⊕y⊕z (XOR pattern of length 3).

Figure 9:
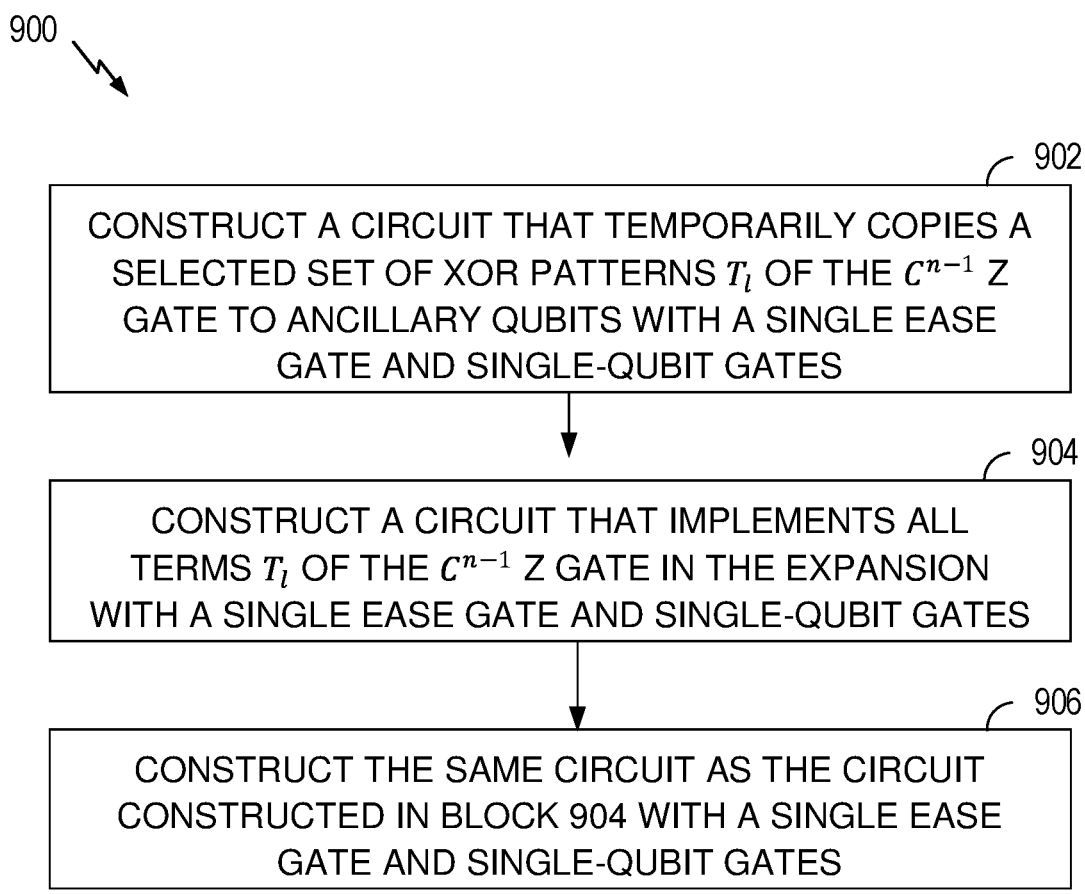
FIG. 9 depicts a flowchart illustrating a method used to construct a circuit that implements a $C^{n-1}$ Z gate acting on n qubits (n=5, 6), according to one embodiment.

FIG. 9 depicts a flowchart illustrating a method 900 to construct a circuit that implements a $C^{n-1}$ Z gate acting on n qubits (n=5, 6), according to one embodiment. The method 900 starts with block 902, in which a circuit that temporarily copies a selected set of XOR patterns $T_l$ of the $C^{n-1}$ Z gate in the expansion to ancillary qubits is constructed by the classical computer. For a $C^4$ Z gate (n=5), the selected set of XOR patterns includes XOR patterns of length 2, $b_2 \oplus b_3$, $b_2 \oplus b_4$, and $b_3 \oplus b_4$ and an XOR pattern of length 5, $b_0 \oplus b_1 \oplus b_2 \oplus b_3 \oplus b_4$, and these XOR patterns are each copied on one of four ancillary qubits that are each prepared in state $|0\rangle$. For this transformation, the circuit includes two CNOT gates each conditioned on one of the Boolean valuables $b_2$ and $b_3$ and targeted on a first ancillary qubit, two CNOT gates each conditioned on one of the Boolean valuables $b_2$ and $b_4$ and targeted on a second ancillary qubit, two CNOT gates each conditioned on one of the Boolean valuables $b_3$ and $b_4$ and targeted on a third ancillary qubit, and five CNOT gates conditioned each on one of the Boolean valuables $b_0$, $b_1$, $b_2$, $b_3$, and $b_4$ and targeted on a fourth ancillary qubit. For a $C^5$ Z gate (n=6), the selected set of XOR patterns includes XOR patterns of length 2, $b_3 \oplus b_5$ and $b_4 \oplus b_5$, XOR patterns of length 4, $b_0 \oplus b_1 \oplus b_2 \oplus b_5$, $b_0 \oplus b_1 \oplus b_3 \oplus b_4$, $b_0 \oplus b_2 \oplus b_3 \oplus b_4$, and $b_1 \oplus b_2 \oplus b_3 \oplus b_4$, and an XOR pattern of length 6, $b_0 \oplus b_1 \oplus b_2 \oplus b_3 \oplus b_4 \oplus b_5$, and these XOR patterns are each copied on one of seven ancillary qubits that are each prepared in state $|0\rangle$. For this transformation, the circuit includes two CNOT gates conditioned on the Boolean valuables $b_3$ and $b_5$, respectively, and targeted on a first ancillary qubit, two CNOT gates conditioned on the Boolean valuables $b_4$ and $b_5$, respectively, and targeted on a second ancillary qubit, four CNOT gates conditioned on the Boolean valuables $b_0$, $b_1$, $b_2$, and $b_5$, respectively, and targeted on a third ancillary qubit, four CNOT gates conditioned on the Boolean valuables $b_0$, $b_1$, $b_3$, and $b_4$, respectively, and targeted on a fourth ancillary qubit, four CNOT gates conditioned on the Boolean valuables $b_0$, $b_2$, $b_3$, and $b_4$, respectively, and targeted on a fifth ancillary qubit, four CNOT gates conditioned on the Boolean valuables $b_1$, $b_2$, $b_3$, and $b_4$, respectively, and targeted on a sixth ancillary qubit, and six CNOT gates conditioned on the Boolean valuables $b_0$, $b_1$, $b_2$, $b_3$, $b_4$, and $b_5$, respectively, and targeted on a seventh ancillary qubit. All of the CNOT gates can be implemented simultaneously by a single EASE gate along with appropriate single-qubit gates. Thus, the circuit constructed in block 902 includes a single EASE gate and single-qubit gates.

In block 904, a circuit that implements all of the terms $T_l$ in the expansion of the $C^{n-1}$ Z gate in the expansion is constructed by the classical computer. All of the terms can be implemented by combinations of ZZ gates $ZZ_{ij}(\theta_{ij})$ and rotation gates Z(θ) with appropriately chosen rotation angles $\theta_{ij}$ and $\theta$. All of these ZZ gates can be implemented in a single EASE gate with appropriate single-qubit gates. Thus, the circuit constructed in block 904 includes a single EASE gate and single-qubit gates.

In block 906, a circuit that includes the same set of CNOT gates as those in block 902 is constructed. This circuit transforms all of the ancillary qubits back to state |0⟩ such that these ancillary qubits can be reused in the following steps. As described above, this set of CNOT gates can be simultaneously implemented in a single EASE gate with appropriate single-qubit gates. Thus, the circuit constructed in block 906 includes a single EASE gate and single-qubit gates.

Thus, the overall circuit that implements a $C^{n-1}$ Z gate acting on n qubits (n=5, 6) includes three EASE gates and single-qubit gates. Since a Toffoli-n gate can be simply obtained by conjugating a $C^{n-1}$ Z gate by a Hadamard gate applied on the target qubit, the circuit that implements Toffoli-5 and Toffoli-6 gates also includes three EASE gates and single-qubit gates.

It should be noted that Toffoli-6 gates constructed as described above can be used to implement a $C^{n-1}$ Z gate (n≥6) efficiently. It is known in the art that a $C^{n-1}$ Z gate can be decomposed using n/2 Toffoli-6 gates. Thus, a $C^{n-1}$ Z gate can be implemented using 3n/2 EASE gates and single-qubit gates. Thus, the method 800 provides improved efficiency over the conventional method using a universal gate set including single-qubit gates and two-qubit gates that requires at least 2n two-qubit gates.

Figure 10:
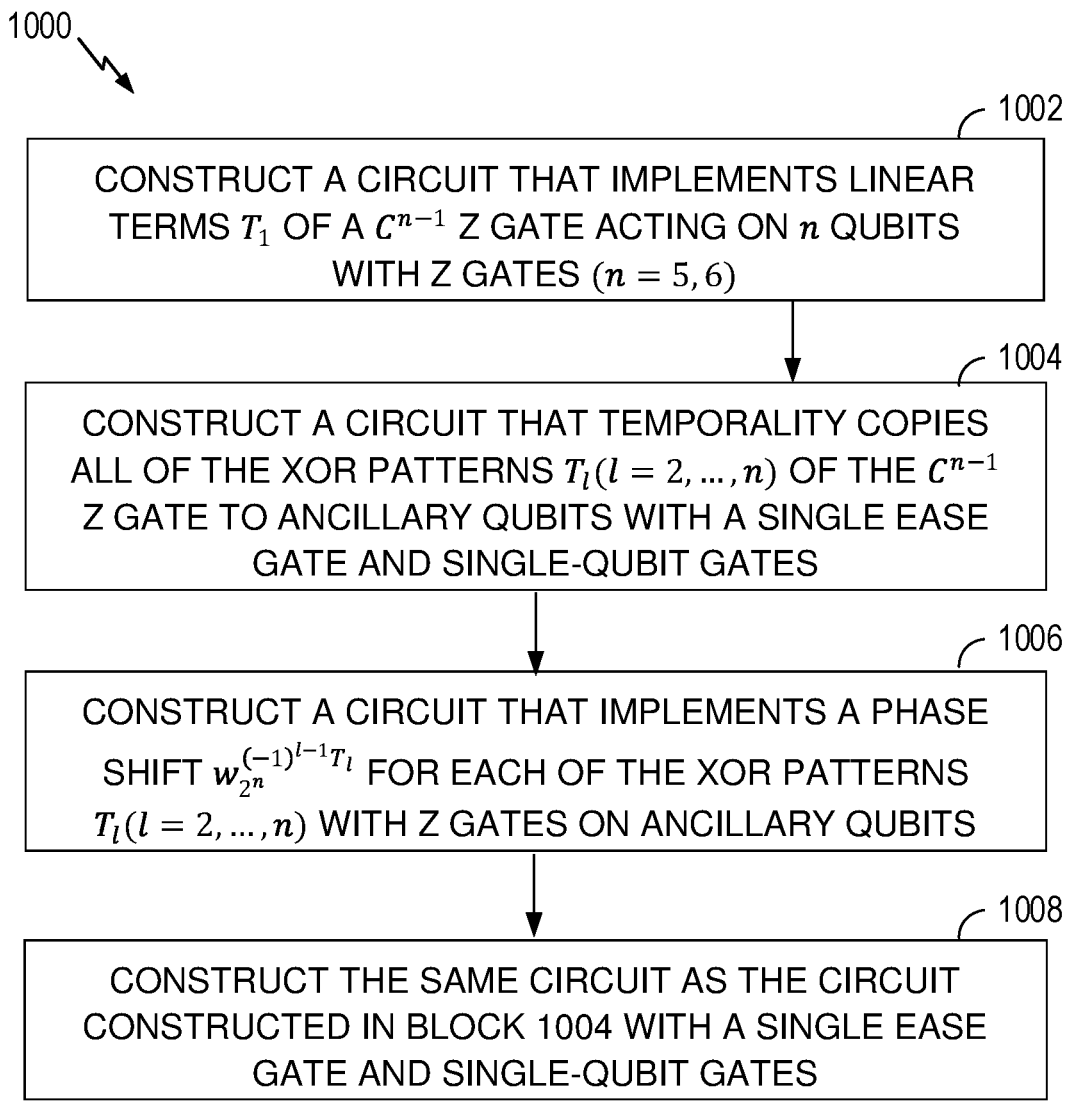
FIG. 10 depicts a flowchart illustrating a method used to construct a circuit that implements a $C^{n-1}$ Z gate acting on n qubits using $2^n$ ancillary qubits, according to one embodiment.

FIG. 10 depicts a flowchart illustrating a method 1000 to construct a circuit that implements a $C^{n-1}$ Z gate acting on n qubits using $O(2^n)$ ancillary qubits, according to one embodiment. The method 1000 starts with block 1002, in which a circuit that implements the linear terms $T_1$ of the $C^{n-1}$ Z gate in the expansion described above is constructed. The circuit constructed in block 1002 is the same as that constructed in block 902 of the method 900 and includes Z gates on qubits j (j=0, 1, . . . , n-1).

In block 1004, a circuit that temporality copies all of the XOR patterns $T_l$(l=2, . . . , n) in the expansion of the $C^{n-1}$ Z gate to ancillary qubits. There are $$\frac{n!}{l!(n-l)!}$$

XOR patterns of length l, each of which is copied to an ancillary qubit. The circuit includes CNOT gates each conditioned on a Boolean variable $b_j$ and targeted on an ancillary qubit that is prepared in state |0⟩. All of the CNOT gates can be implemented simultaneously in a single EASE gate along with appropriate single-qubit gates. Thus, the circuit constructed in block 1004 includes a single EASE gate and single-qubit gates.

In block 1006, a circuit that implements a phase shift $$w_{2^n}^{(-1)^{l-1}T_l}$$

for each of the XOR patterns $T_l$(l=2, . . . , n) is constructed by the classical computer. All XOR patterns are already copied to the ancillary qubits, thus the circuit constructed in block 1006 includes Z gates on the ancillary qubits.

In block 1008, a circuit that transforms all ancillary qubits back to state |0⟩ is constructed by the classical computer.

The circuit constructed in block 1008 is the same as that constructed in block 1004 and includes a single EASE gate and single-qubit gates.

Thus, the overall circuit that implements a $C^{n-1}$ Z gate acting on n qubits using $2^n$ ancillary qubits includes two EASE gates and single-qubit gates. Thus, the method 1000 provides improved efficiency over the conventional method using a universal gate set including single-qubit gates and two-qubit gates that requires at least 2n two-qubit gates.

Quantum Permutation Gates

Figure 11:
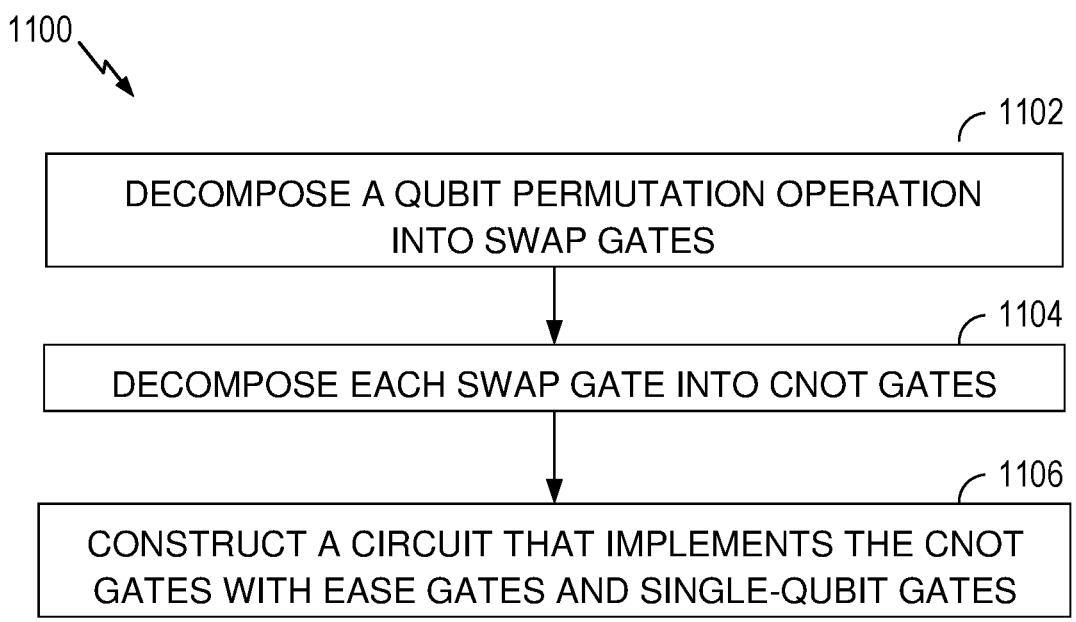
FIG. 11 depicts a flowchart illustrating a method used to construct a circuit that implements a qubit permutation gate acting on n qubits, according to one embodiment.

FIG. 11 depicts a flowchart illustrating a method 1100 to construct a circuit that implements a qubit permutation gate acting on n qubits, according to one embodiment. The method 1100 starts with block 1102, in which a qubit permutation operation is decomposed into SWAP gates. It is known in the art that a qubit permutation operation can be implemented as four layers of SWAP gates using n ancillary qubits, or six layers of SWAP gates not using ancillary qubits.

In block 1104, each SWAP gate is decomposed into CNOT gates. It is known in the art a SWAP gate can be implemented as three CNOT gates.

In block 1106, a circuit that implements the CNOT gates is constructed by the classical computer. Since each of the CNOT gates can be implemented by a single EASE gate along with appropriate single-qubit gates, the circuit constructed in block 1106 includes three EASE gates and single-qubit gates.

Thus, the overall circuit that implements a qubit permutation includes 12 EASE gates and single-qubit gates using n ancillary qubits, or 18 EASE gates and single-qubit gates not using ancillary qubits. Thus, the method 1100 provides improved efficiency over the conventional method using a universal gate set including single-qubit gates and two-qubit gates that requires O(n) two-qubit gates.

Controlled Permutation Gate

Figure 12:
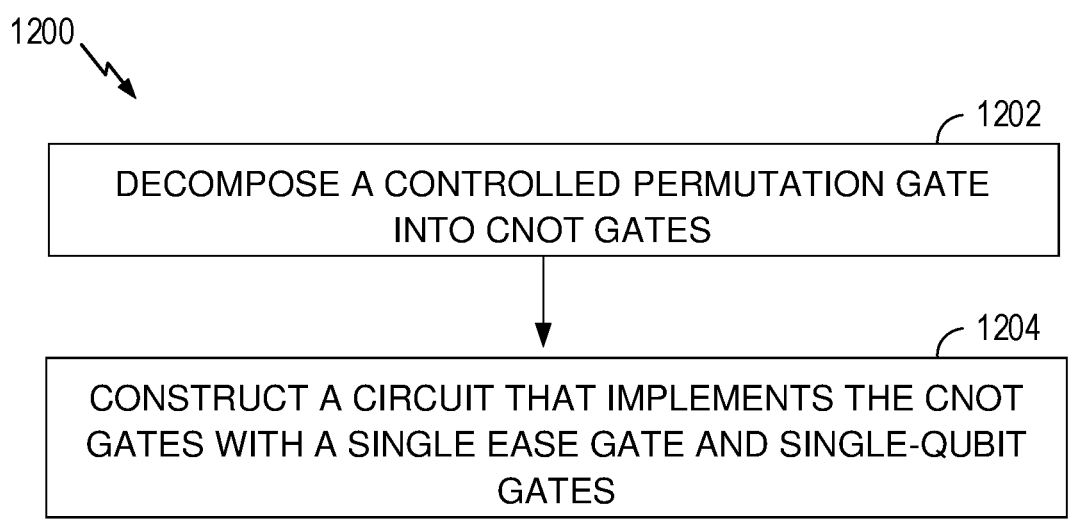
FIG. 12 depicts a flowchart illustrating a method used to construct a circuit that implements a controlled SWAP gate acting on n qubits, according to one embodiment.

FIG. 12 depicts a flowchart illustrating a method 1200 to construct a circuit that implements a controlled permutation gate acting on n qubits, according to one embodiment. The method 1200 starts with block 1202, in which a controlled permutation gate is decomposed into controlled SWAP gates with a shared control. It is known in the art each controlled SWAP gate can be implemented as seven CNOT gates.

In block 1204, a circuit that implements the CNOT gates is constructed by the classical computer. Since each of the seven CNOT layers can be implemented simultaneously in a single EASE gate along with appropriate single-qubit gates, the circuit constructed in block 1204 includes seven EASE gates and single-qubit gates.

Thus, the overall circuit that implements a controlled permutation gate includes O(1) EASE gates and single-qubit gates. Thus, the method 1200 provides improved efficiency over the conventional method using a universal gate set including single-qubit gates and two-qubit gates that requires O(n) two-qubit gates.

Using the method described herein to implement a controlled permutation gate, the complexity of quantum algorithms that use controlled permutations can be reduced. For example, the circuit depth of a string-matching algorithm, which matches a pattern of length M in a text of length N, can be reduced from $O(\sqrt{N}((\log N)^2 + \log M))$ to $O(\sqrt{N}(\log N + \log M))$. The number of ancillary qubits is also reduced by log N.

Various quantum circuits including one or more EASE gates and single-qubit gates formed by use of a classical computer using the methods described herein are implemented on a quantum computer, in combination with other quantum circuits to perform quantum computations. Each EASE gate can be implemented on a quantum computer by the method described in detail in in the U.S. application Ser. No. 16/578,137 (entitled "Simultaneously Entangling Gates For Trapped-Ion Quantum Computers") and the U.S. application Ser. No. 16/854,043 (entitled "Amplitude, Frequency, And Phase Modulated Simultaneous Entangling Gates For Trapped-Ion Quantum Computers") which are incorporated by reference herein. An EASE gate that simultaneously performs entangling gate operations on arbitrary pairs of qubits within a quantum processor can be implemented by applying a laser pulse to each of the participating qubits, where the amplitude and phase of each pulse is appropriately adjusted by software program(s) within a classical computer. The pulses determined by the software program(s) are applied to the participating qubits within the quantum processor (the chain of N trapped ions) to perform the EASE gate operation on the selected pairs of qubits, controlled by a system controller.

At the end of quantum computation, population of the qubit states (trapped ions) within the quantum processor (including a group 106 of trapped ions) is determined (read-out) by measurements obtained by the imaging objective 108 and mapped onto the PMT 110, so that the results of the quantum computation can be determined and provided as input to the classical computer (e.g., digital computer). The results of the quantum computation can then be processed by the classical computer 102 and output to a user interface, such as graphics processing unit (GPU) of the classical computer 102, printed on to paper and/or saved in the memory of the classical computer 102. The results of the quantum computation may be used by the classical computer to perform a desired activity or obtain solutions to problems that are typically not ascertainable, or ascertainable in a reasonable amount of time, by the classical computer alone. The problems that are known to be intractable or unascertainable by the conventional computers (i.e., classical computers) today and may be solved by use of the results obtained from the performed quantum computations may include, but are not limited to simulating internal chemical structures of complex molecules and materials, and factoring a large integer.

The methods for constructing quantum circuits using EASE gates described herein provide improvements in computational complexity over other existing methods for constructing quantum circuits known in the art. A CZ gate layer acting on n qubits can be implemented by a single EASE gate and single-qubit gates by the method 600 described above, while the conventional method using a universal gate set including single-qubit gates and two-qubit gates requires $O(n^2)$ two-qubit gates. A CNOT gate layer acting on n qubits can be implemented by 2n EASE gates and single-qubit gates, without ancillary qubits, by the method 700 described above, while the conventional method requires $O(n^2)$ two-qubit gates. A CNOT gate layer acting on n qubits can be implemented by 6 log n EASE gates and single-qubit gates, with n/2 ancillary qubits, by the method 800 described above, while the conventional method requires $O(n^2)$ two-qubit gates. Toffoli-5 and Toffoli-6 gates can be implemented by 3 EASE gates and single-qubit gates by the method 900 described above, while the conventional method requires at least 10 and 12 two-qubit gates. A Toffoli-n gate acting on n qubits can be implemented by 3n/2 EASE gates and single-qubit gates by the method 900 described above, while the conventional method requires at least 2n two-qubit gates. A Toffoli-n gate acting on n qubits can be implemented by 2 EASE gates, with $O(2^n)$ ancillary qubits, by the method 1000 described above, while the conventional method requires at least 2n two-qubit gates. A qubit permutation operation and a controlled permutation gate acting on n qubits can each be implemented by $O(1)$ EASE gates (i.e., the number of required EASE gates is constant as the number n of qubits increases) and single qubits, while the conventional method requires $O(n)$ two-qubit gates.

While the foregoing is directed to specific embodiments, other and further embodiments may be devised without departing from the basic scope thereof, and the scope thereof is determined by the claims that follow.

The invention claimed is:

1. A method of performing computation using an ion trap quantum computing system comprising a classical computer, a system controller, and a quantum processor, comprising:
   computing, by the classical computer, a circuit that implements a selected set of gate operations, using one or more efficient arbitrary simultaneous entangling (EASE) gates;
   implementing, by the system controller, the computed circuit on the quantum processor;
   measuring, by the system controller, population of qubit states in the quantum processor; and
   outputting, by the classical computer, the measured population of qubit states in the quantum processor,
   wherein the selected set of gate operations satisfies at least one of the following:
   a) the selected set of gate operations comprises a layer of one or more controlled Z gates, each of which is applied on a pair of qubits among n qubits in the quantum processor, and the computed circuit comprises a single EASE gate and single-qubit gates,
   b) the selected set of gate operations comprises a layer of one or more controlled NOT gates, each of which is applied on a pair of qubits among n qubits in the quantum processor, and the computed circuit comprises 2n EASE gates and single-qubit gates,
   c) the selected set of gate operations comprises a layer of one or more controlled NOT gates, each of which is applied on a pair of qubits among n qubits in the quantum processor, and the computed circuit comprises 6 log n EASE gates and single-qubit gates, using n/2 ancillary qubits,
   d) the selected set of gate operations comprises a multi-controlled NOT gate acting on n qubits in the quantum processor, and the computed circuit comprises 3n/2 EASE gates and single-qubit gates,
   e) the selected set of gate operations comprises a qubit permutation gate acting on n qubits in the quantum processor, and the computed circuit comprises 12 EASE gates and single-qubit gates using n ancillary qubits, or 18 EASE gates and single-qubit gates not using n ancillary qubits, or
   f) the selected set of gate operations comprises a controlled permutation gate acting on n qubits in the quantum processor, and the computed circuit comprises $0(1)$ EASE gates and single-qubit gates.

2. An ion trap quantum computing system, comprising:
   a quantum processor comprising n qubits, each qubit comprising a trapped ion having two hyperfine states;

one or more lasers configured to emit a laser beam, which is provided to trapped ions in the quantum processor;

a classical computer configured to perform operations comprising:

computing a circuit that implements a selected set of gate operations, using one or more efficient arbitrary simultaneous entangling (EASE) gates; and a system controller configured to execute a control program to control the one or more lasers to perform operations on the quantum processor, the operations comprising:

implementing the computed circuit on the quantum processor; and measuring population of qubit states in the quantum processor, wherein the classical computer is further configured to output the measured population of qubit states in the quantum processor, and the selected set of gate operations satisfies at least one of the following:

a) the selected set of gate operations comprises a layer of one or more controlled Z gates, each of which is applied on a pair of qubits among n qubits in the quantum processor, and the computed circuit comprises a single EASE gate and single-qubit gates, b) the selected set of gate operations comprises a layer of one or more controlled NOT gates, each of which is applied on a pair of qubits among n qubits in the quantum processor, and the computed circuit comprises 2n EASE gates and single-qubit gates, c) the selected set of gate operations comprises a layer of one or more controlled NOT gates, each of which is applied on a pair of qubits among n qubits in the quantum processor, and the computed circuit comprises 6 log n EASE gates and single-qubit gates, using n/2 ancillary qubits, d) the selected set of gate operations comprises a multi-controlled NOT gate acting on n qubits in the quantum processor, and the computed circuit comprises 3n/2 EASE gates and single-qubit gates, e) the selected set of gate operations comprises a qubit permutation gate acting on n qubits in the quantum processor, and the computed circuit comprises 12 EASE gates and single-qubit gates using n ancillary qubits, or 18 EASE gates and single-qubit gates not using n ancillary qubits, or f) the selected set of gate operations comprises a controlled permutation gate acting on n qubits in the quantum processor, and the computed circuit comprises 0(1) EASE gates and single-qubit gates.

3. An ion trap quantum computing system, comprising:

a classical computer;

a quantum processor comprising n qubits, each qubit comprising a trapped ion having two hyperfine states;

a system controller configured to execute a control program to control the one or more lasers to perform operations on the quantum processor; and non-volatile memory having a number of instructions stored therein which, when executed by one or more processors, causes the ion trap quantum computing system to perform operations comprising:

computing, by the classical computer, a circuit that implements a selected set of gate operations, using one or more efficient arbitrary simultaneous entangling (EASE) gates;

implementing, by the system controller, the computed circuit on the quantum processor;

measuring, by the system controller, population of qubit states in the quantum processor; and outputting, by the classical computer, the measured population of qubit states in the quantum processor, wherein the selected set of gate operations satisfies at least one of the following:

a) the selected set of gate operations comprises a layer of one or more controlled Z gates, each of which is applied on a pair of qubits among n qubits in the quantum processor, and the computed circuit comprises a single EASE gate and single-qubit gates, b) the selected set of gate operations comprises a layer of one or more controlled NOT gates, each of which is applied on a pair of qubits among n qubits in the quantum processor, and the computed circuit comprises 2n EASE gates and single-qubit gates, c) the selected set of gate operations comprises a layer of one or more controlled NOT gates, each of which is applied on a pair of qubits among n qubits in the quantum processor, and the computed circuit comprises 6 log n EASE gates and single-qubit gates, using n/2 ancillary qubits, d) the selected set of gate operations comprises a multi-controlled NOT gate acting on n qubits in the quantum processor, and the computed circuit comprises 3n/2 EASE gates and single-qubit gates, or e) the selected set of gate operations comprises a qubit permutation gate acting on n qubits in the quantum processor, and the computed circuit comprises 12 EASE gates and single-qubit gates using n ancillary qubits, or 18 EASE gates and single-qubit gates not using n ancillary qubits.

* * * * *